(12) United States Patent
Yasuda et al.

(10) Patent No.: US 10,684,682 B2
(45) Date of Patent: Jun. 16, 2020

(54) INFORMATION PROCESSING DEVICE AND INFORMATION PROCESSING METHOD

(71) Applicant: SONY CORPORATION, Tokyo (JP)

(72) Inventors: Ryouhei Yasuda, Kanagawa (JP); Takuro Noda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/066,790

(22) PCT Filed: Nov. 7, 2016

(86) PCT No.: PCT/JP2016/082934
§ 371 (c)(1),
(2) Date: Jun. 28, 2018

(87) PCT Pub. No.: WO2017/126195
PCT Pub. Date: Jul. 27, 2017

(65) Prior Publication Data
US 2019/0011983 A1    Jan. 10, 2019

(30) Foreign Application Priority Data

Jan. 18, 2016    (JP) ................... 2016-006848

(51) Int. Cl.
*G09G 5/00* (2006.01)
*G06F 3/01* (2006.01)
(Continued)

(52) U.S. Cl.
CPC ............ *G06F 3/013* (2013.01); *G06F 3/012* (2013.01); *G06F 3/0304* (2013.01); *G06F 3/038* (2013.01);
(Continued)

(58) Field of Classification Search
CPC .......... G06F 3/013; G06F 3/01; G06F 3/0346; G06F 3/038; G06F 3/03; G06F 3/048; G06F 3/0481; G06F 3/0484
(Continued)

(56) References Cited

U.S. PATENT DOCUMENTS

2011/0128223 A1* 6/2011 Lashina ............... G06F 3/012
345/158
2015/0234461 A1* 8/2015 Suzuki ............... G06F 3/013
345/156
(Continued)

FOREIGN PATENT DOCUMENTS

CN    104685541 A    6/2015
EP    2709060 A1    3/2014
(Continued)

OTHER PUBLICATIONS

International Search Report and Written Opinion of PCT Application No. PCT/JP2016/082934, dated Feb. 7, 2017, 08 pages of ISRWO.
(Continued)

*Primary Examiner* — Jennifer T Nguyen
(74) *Attorney, Agent, or Firm* — Chip Law Group

(57) ABSTRACT

Provided is an information processing device including: a processing unit configured to acquire gaze-related information corresponding to a user on a basis of a detection result of a head of the user and a detection result of a line of sight of the user.

18 Claims, 26 Drawing Sheets

(51) Int. Cl.
  *G06F 3/038* (2013.01)
  *G06F 3/0346* (2013.01)
  *G06F 3/0484* (2013.01)
  *G06F 3/03* (2006.01)
(52) U.S. Cl.
  CPC ........ *G06F 3/0346* (2013.01); *G06F 3/04842* (2013.01)
(58) Field of Classification Search
  USPC .................................................... 345/8, 156
  See application file for complete search history.

(56) References Cited

U.S. PATENT DOCUMENTS

| | | | |
|---|---|---|---|
| 2015/0243036 A1 | 8/2015 | Hoffmann et al. | |
| 2016/0202757 A1* | 7/2016 | Miao | H04N 5/33 348/78 |
| 2016/0342205 A1* | 11/2016 | Shigeta | A61B 3/113 |

FOREIGN PATENT DOCUMENTS

| | | |
|---|---|---|
| JP | 2015-152939 A | 8/2015 |
| JP | 2015-528359 A | 9/2015 |
| WO | 2014/041188 A1 | 3/2014 |

OTHER PUBLICATIONS

Takashi Nagamatsu, A Model of Rotation of the Visual and Optical Axes of the Eyeball on the Basis of Listing's Law, and Gaze-Estimation and Evaluation Method Using the Model, The Transactions of the Institute of Electronics, Information and Communication Engineers, Apr. 1, 2010, vol. J93-D, No. 4, pp. 511-521.

Nagamatsu, et al., "A Model of Rotation of the Visual and Optical Axes of the Eyeball on the Basis of Listing's Law, and Gaze-Estimation and Evaluation Method Using the Model", vol. J93-D, No. 4, pp. 511-521.

* cited by examiner

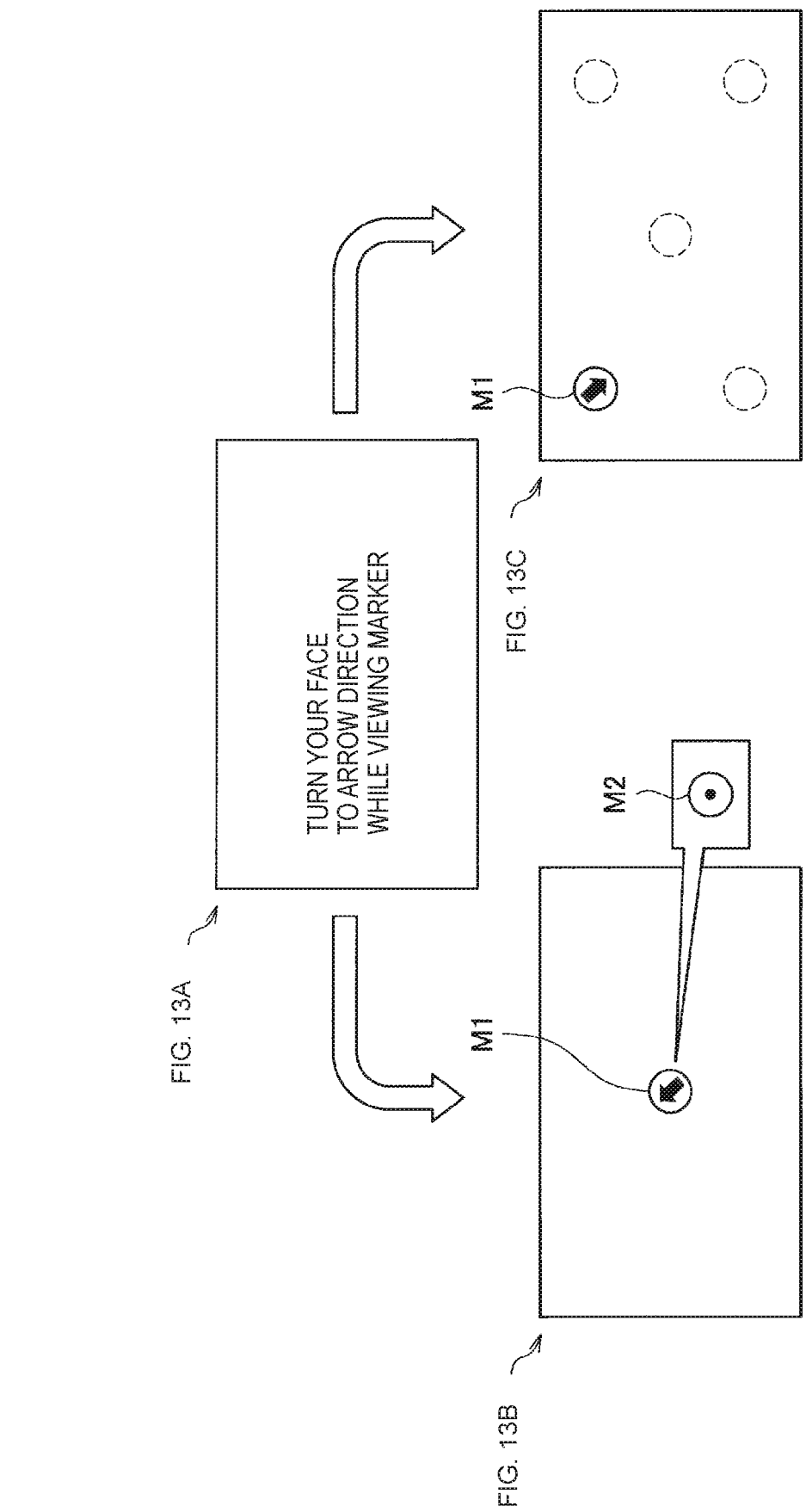

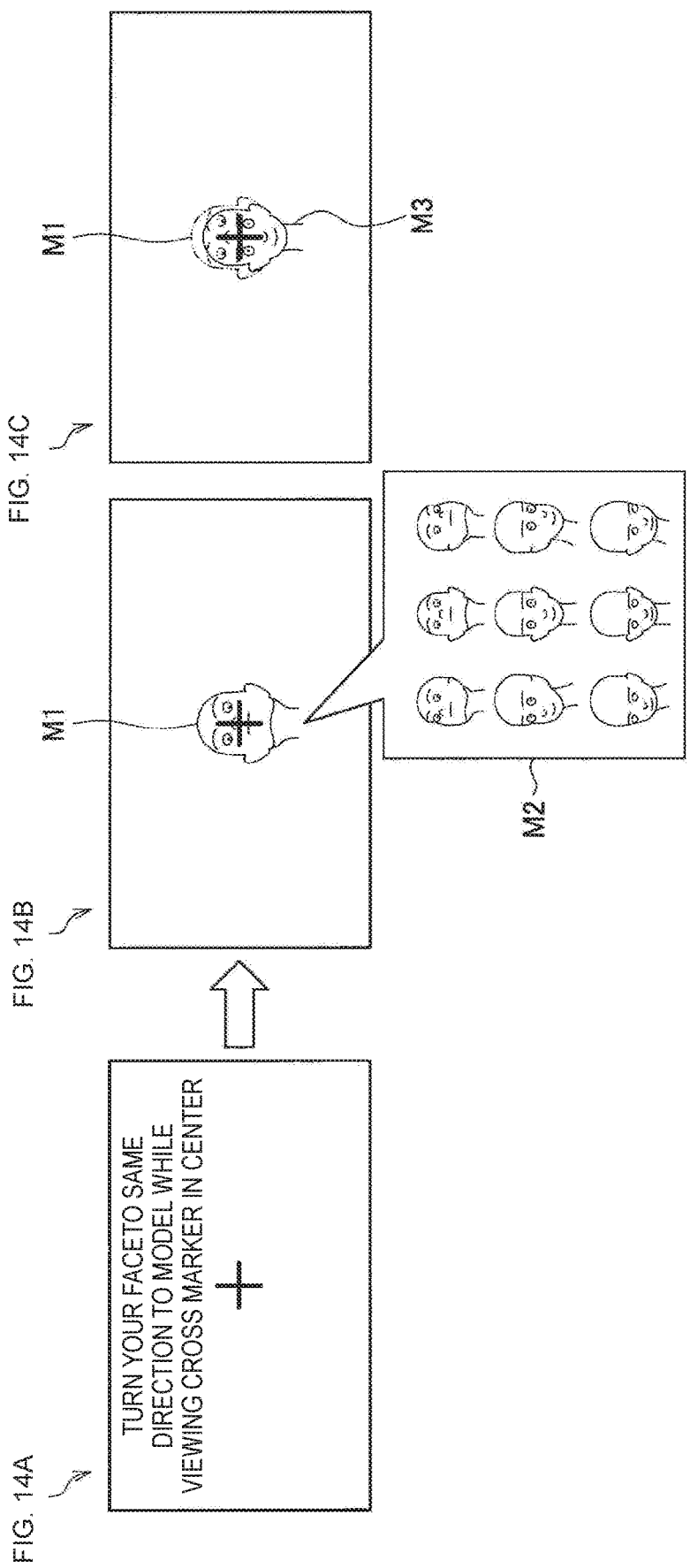

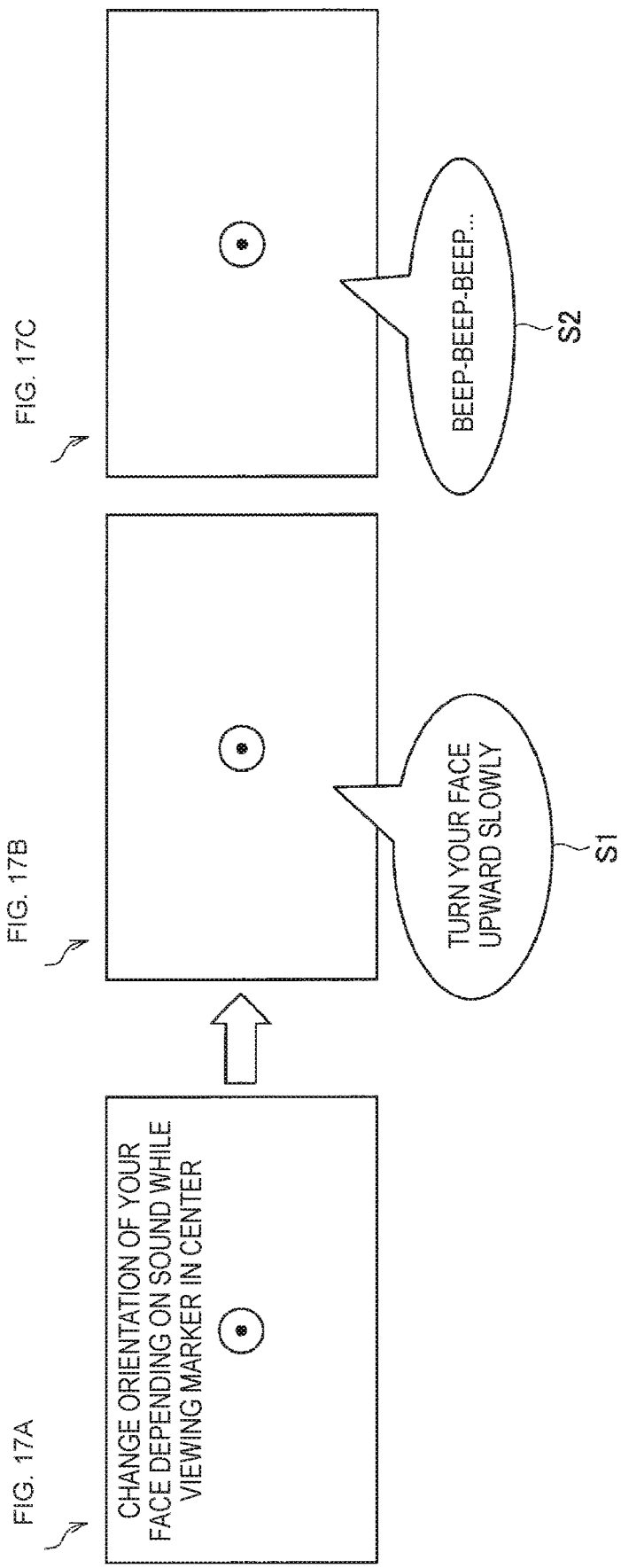

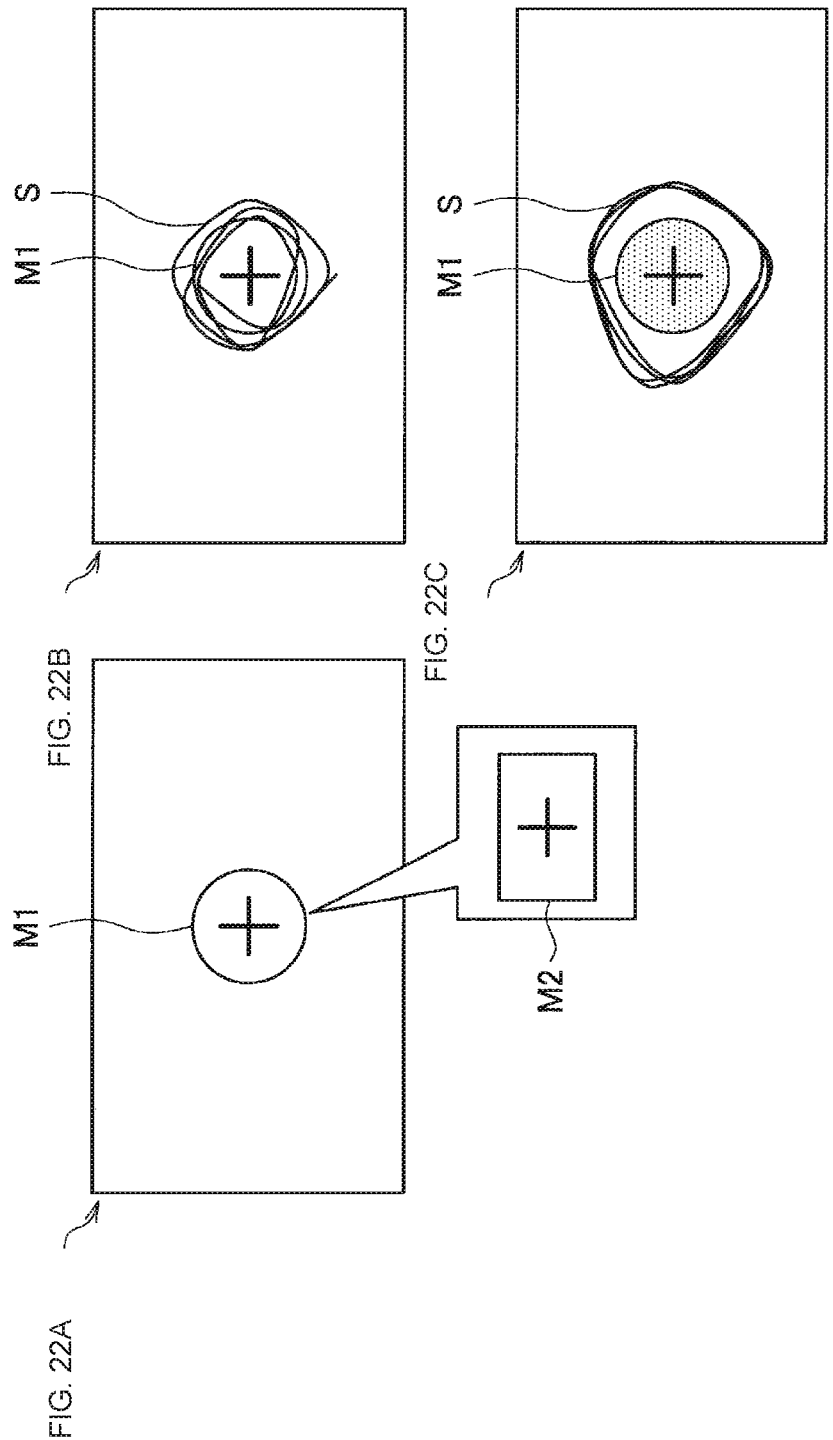

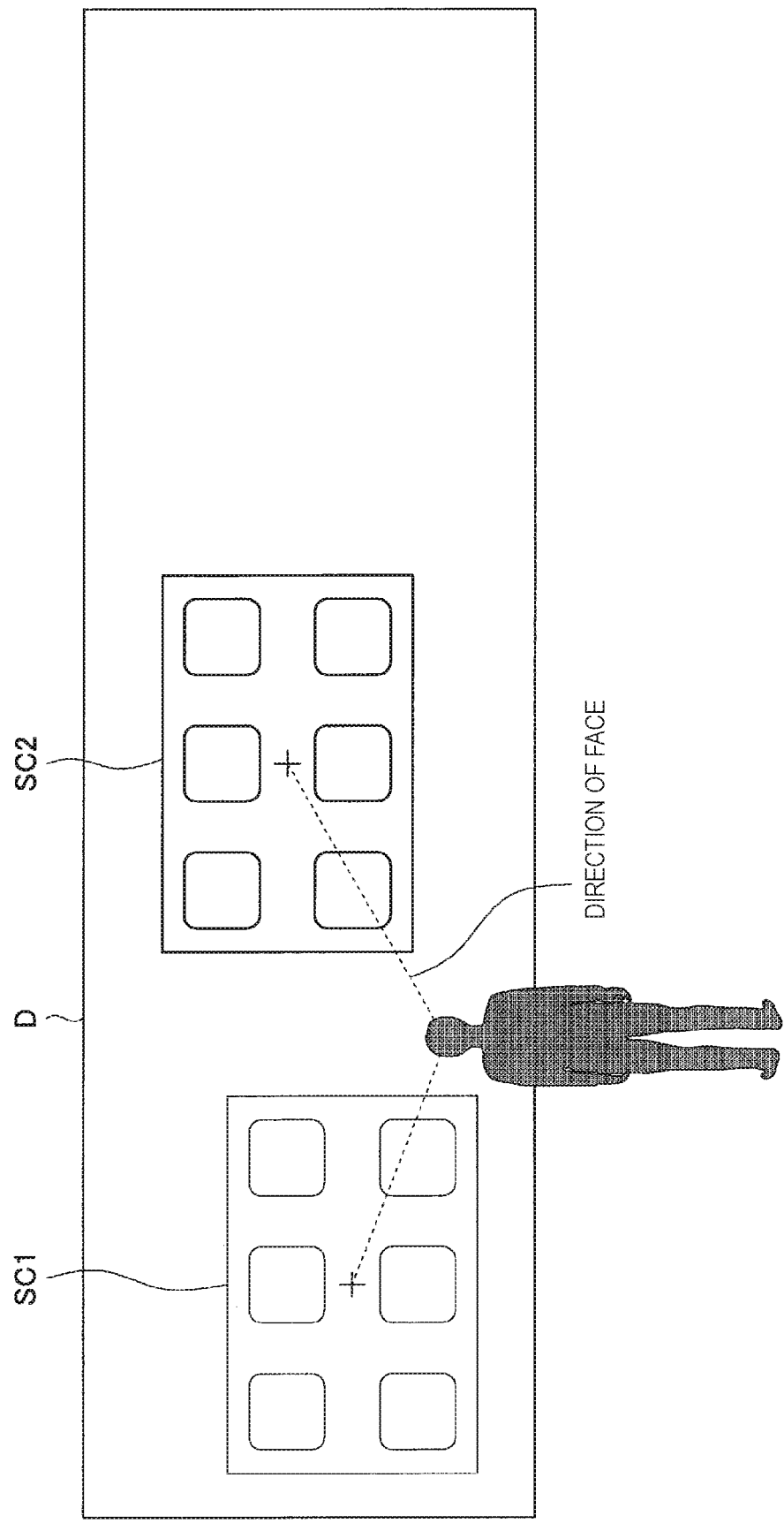

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2016/082934 filed on Nov. 7, 2016, which claims priority benefit of Japanese Patent Application No. JP 2016-006848 filed in the Japan Patent Office on Jan. 18, 2016. Each of the above-referenced applications is hereby incorporated herein by reference in its entirety.

TECHNICAL FIELD

The present disclosure relates to an information processing device, an information processing method, and a program.

BACKGROUND ART

Examples of an approach used for detection of a line of sight include "technique of using corneal reflex (pupil-corneal reflex) using a corneal reflection image (also called "Purkinje image") obtained when light emitting from a light source such as infrared light emitting diode (IR LED) is reflected from the corneal surface", "technique of using a detection result of muscle electric potential of eyeball", or the like.

In this regard, there may be a case where an error occurs between the position or the like at which the user views, which is estimated from a result of detection of a line of sight that is obtained by using the approach as described above and the position or the like at which the user is actually gazing. Thus, calibration is performed on the line-of-sight detection result detected using the approach as described above to reduce the error, and estimation is performed on the position or the like at which the user views using the calibrated line-of-sight detection result.

Under such circumstances, technology regarding the calibration of a line of sight is developed. An example of technology regarding the calibration of the line of sight includes a technique disclosed in Patent Literature 1 below.

CITATION LIST

Patent Literature

Patent Literature 1: JP 2015-152939A

DISCLOSURE OF INVENTION

Technical Problem

When calibration information (described later) used for calibrating the detected line of sight is acquired, in one example, there may be cases where the swing width of the user's eyes is too large, the swing width of the user's eyes is too small, or the swing width of the user's eyes is biased. In such cases, the calibration of the line-of-sight detection result using the acquired calibration information may be likely to fail to reduce sufficiently the error described above. Thus, even if calibration is performed on the line-of-sight detection result using the calibration information, the accuracy in estimation of the position, direction, or the like where the user is gazing may fail to achieve sufficient level of accuracy.

In the present disclosure, there is provided a novel and improved information processing device, information processing method, and program, capable of improving the accuracy in estimating the user's line of sight.

Solution to Problem

According to the present disclosure, there is provided an information processing device including: a processing unit configured to acquire gaze-related information corresponding to a user on a basis of a detection result of a head of the user and a detection result of a line of sight of the user.

In addition, according to the present disclosure, there is provided an information processing method executed by an information processing device, the method including: a step of acquiring gaze-related information corresponding to a user on a basis of a detection result of a head of the user and a detection result of a line of sight of the user.

In addition, according to the present disclosure, there is provided a program causing a computer to implement: a function of acquiring gaze-related information corresponding to a user on a basis of a detection result of a head of the user and a detection result of a line of sight of the user.

Advantageous Effects of Invention

According to the present disclosure, it is possible to improve the accuracy in estimating the user's line of sight.

Note that the effects described above are not necessarily limitative. With or in the place of the above effects, there may be achieved any one of the effects described in this specification or other effects that may be grasped from this specification.

BRIEF DESCRIPTION OF DRAWINGS

FIGS. 13A, 13B, and 13C are diagrams illustrated to describe guidance processing regarding the information processing method according to the present embodiment.

FIGS. 14A, 14B, and 14C are diagrams illustrated to describe guidance processing regarding the information processing method according to the present embodiment.

FIGS. 17A, 17B, and 17C are diagrams illustrated to describe guidance processing regarding the information processing method according to the present embodiment.

FIGS. 22A, 22B, and 22C are diagrams illustrated to describe guidance processing regarding the information processing method according to the present embodiment.

FIG. 24 is a diagram illustrated to describe an example of software control processing regarding the information processing method according to the present embodiment.

MODE(S) FOR CARRYING OUT THE INVENTION

Figure 1:
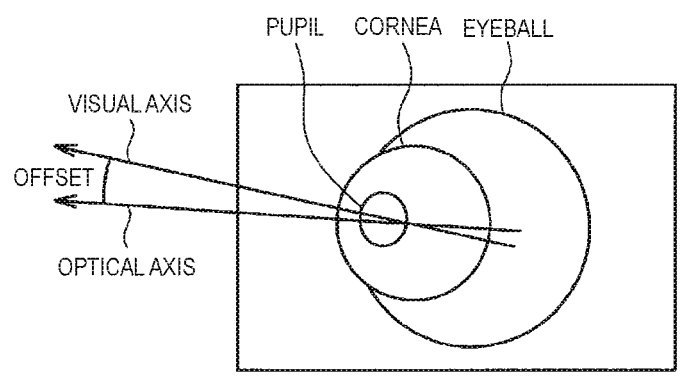
FIG. 1 is a diagram illustrated to describe an example of a method of calibrating a line-of-sight detection result.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Moreover, the description will be given in the order listed below.
1. Information processing method according to present embodiment
2. Information processing device according to present embodiment
3. Program according to present embodiment Information Processing Method According to Present Embodiment An information processing method according to the present embodiment is now described. The following description is given as an example of a case where an information processing device according to the present embodiment performs processing regarding the information processing method according to the present embodiment.

[1] Method of Calibrating Line-of-Sight Detection Result

A method of calibrating a line-of-sight detection result is now described. The following description is given as an example of a method of calibrating a line-of-sight detection result in a case where a line of sight is detected by the technique of using the corneal reflex.

FIG. 1 is a diagram illustrated to describe an example of a method of calibrating the line-of-sight detection result, and illustrates an example of a captured image obtained by capturing the user's eye.

Examples of an axis related to the user's line-of-sight include an optical axis and a visual axis as illustrated in FIG. 1.

Here, the optical axis is a corneal normal line passing through the center of the pupil and, in one example, is relevant to a line connecting the corneal center position (three-dimensional position of corneal center (corneal curvature center)) and the pupil center position (three-dimensional position of pupil center). The optical axis can be estimated using, in one example, an eyeball 3D model. On the other hand, the visual axis fails to be estimated, by using the eye 3D model unlike the optical axis. Thus, examples of the detection result of line of sight using the corneal reflex include a detection result based on the optical axis, for example, one or more of a direction indicated by the detected optical axis, a vector indicating the detected optical axis, a position at which a user views, which is specified on the basis of the detected optical axis, and the like.

The visual axis is a line connecting the nodal point (the central posterior surface of the crystalline lens) and the fovea centralis, and is relevant to the axis where the user (person) views actually. The visual axis and the optical axis do not coincide with each other as illustrated in FIG. 1, and the visual axis is tilted about 4[°] to 8[°] with respect to the optical axis. In addition, there are individual differences in the degree of tilt of the visual axis with respect to the optical axis.

The calibration is performed to make the deviation of the visual axis with respect to the optical axis ("offset" illustrated in FIG. 1) as described above smaller.

Further, the visual axis fails to be estimated using the eyeball 3D model unlike the optical axis as described above. Thus, the visual axis is estimated by calibrating the optical axis in accordance with, in one example, the procedure described below.

Estimate the optical axis when the user views a certain point in the field of view (hereinafter referred to as "calibration point"), Calculate difference between the vector from the corneal curvature center to the calibration point and the optical axis vector, and Estimate the visual axis at a time point when the user views a certain point from the optical axis at that time point using the calibration information based on the difference.

Examples of the calibration information include a correction coefficient used to correct the deviation of the visual axis with respect to the optical axis ("offset" illustrated in FIG. 1).

Here, the correction coefficient used for the calibration varies depending on the orientation of the eyeball. Thus, in a case where the calibration is performed, a plurality of calibration points (e.g., 5 to 9 points) in the normal field of view are used. One exemplary reason that the correction coefficient differs depending on the orientation of the eyeball is that rotation in the roll direction is added depending on the viewing direction due to rotation of the eyeball by the tension of the muscle.

The correction coefficient indicated by the calibration information is obtained by calculating a correlation coefficient from the distribution of calibration points and the distribution of the sampled data after performing one calibration for each of the plurality of calibration points and by obtaining the correction coefficient from the calculated correlation coefficient. The correction coefficient indicated by the calibration information is obtainable, in one example, by using the technique disclosed in Patent Literature 1 filed by the same applicant.

As will be described later, examples of the sampled data used to obtain the correction coefficient indicated by the calibration information in the information processing method according to the present embodiment include data corresponding to a predetermined angle of the eye. In addition, as will be described later, the sampled data according to the present embodiment is acquired on the basis of a result of detection of the head and a result of detection of the line-of-sight. In other words, the calibration information according to the present embodiment is obtained on the basis of, in one example, the head detection result and the line-of-sight detection result. The sampled data used to obtain the calibration information is referred hereinafter to as "detection data for calibration calculation" in some cases.

Moreover, the method of acquiring the correction coefficient indicated by the calibration information is not limited to the example described above. The information processing device according to the present embodiment may obtain the correction coefficient, in one example, by any method capable of calculating the correction coefficient using the sampled data according to the present embodiment.

In one example, as described above, the calibration of the optical axis using the calibration information allows the visual axis that is the axis actually viewed by the user to be estimated.

Further, in a case of calibrating the line-of-sight detection result, it is necessary to prevent the use of the calibration information when the user does not view the calibration point to ensure the calibration accuracy. The information processing device according to the present embodiment is intended to ensure the calibration accuracy by, in one example, the processing as described below.

Ignore the detection result of the user's line of sight when the user's eye movement is not statically determined.

Ignore the detection result of the user's line of sight when the difference between the vector connecting the position of the user's eyes and the calibration point and the optical axis vector is larger than a predetermined value.

Perform again the calibration (retry the calibration) in a case where the contribution rate of the calculated correlation coefficient (value representing the strength of correlation) is equal to or less than a preset threshold (or a case where the contribution rate is smaller than the threshold).

[2] One Factor of Hindrance to Improvement in Accuracy of Visual Axis Estimation However, as described above, when the calibration information is acquired, in one example, there may be cases where the swing width of the user's eyes is too large, the swing width of the user's eyes is too small, or the swing width of the user's eyes is biased. In these cases, the calibration of the line-of-sight detection result using the acquired calibration information may be likely to fail to reduce sufficiently the deviation of the visual axis with respect to the optical axis ("offset" illustrated in FIG. 1).

Figure 2:
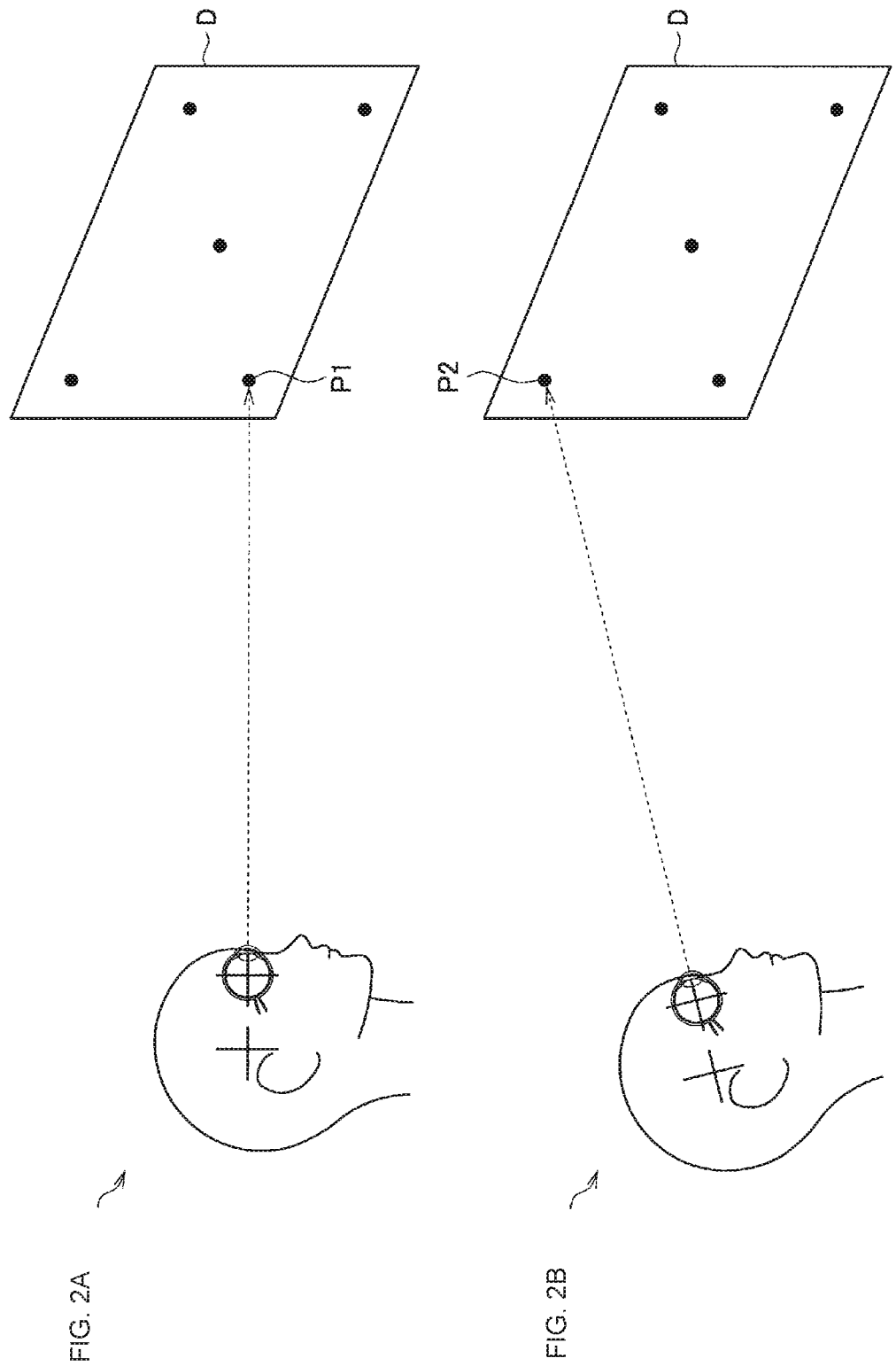
FIGS. 2A and 2B are diagrams illustrated to describe one factor that hinders an improvement in the accuracy in estimating a visual axis.

FIGS. 2A and 2B are diagrams illustrated to describe one factor that hinders an improvement in estimation accuracy of the visual axis. FIGS. 2A and 2B illustrate an example in which five calibration points are displayed on a display screen D and calibration is performed using the five calibration points. Examples of the display screen D include "a display screen of a display device", "a wall on which an image is projected by an image projection device such as a projector", and the like (similarly applied hereinafter).

Further, FIGS. 2A and 2B illustrate an example in which the angle of the eye with respect to the front direction of the head does not change even if the user views different calibration point. In FIGS. 2A and 2B, FIG. 8A illustrates a case where the user views a calibration point P1, and FIG. 2B illustrates a case where the user views a calibration point P2.

In one example, there may be a case where the user tilts the head upward to view the calibration point P2 as illustrated in FIG. 2B. In this case, the angle of the eye with respect to the front direction of the head may be likely not to change comparing to the case of viewing the calibration point P1 illustrated in FIG. 2A.

In one example, as illustrated in FIGS. 2A and 2B, even when the positions of the calibration points are different, in a case where the user views while facing in the direction of a calibration point, the angle of the eyeball hardly changes. In the above case, even if the line-of-sight detection result is calibrated using the acquired calibration information, the deviation of the visual axis with respect to the optical axis ("offset" illustrated in FIG. 1) may fail to be reduced sufficiently.

[3] Processing Regarding Information Processing Method According to Present Embodiment

[3-1] Overview of Processing Regarding Information Processing Method According to Present Embodiment Then, the information processing device according to the present embodiment acquires gaze-related information corresponding to a user on the basis of a result of detection of the head of the detection target user (hereinafter simply referred to as "user") and a result of detection of the user.

Examples of the gaze-related information according to the present embodiment include data indicating one or both of an estimated gaze direction and an estimated gaze position. Examples of the gaze direction according to the present embodiment include a central direction perceived by the user, and examples of the gaze position according to the present embodiment include a position perceived by the user. The acquisition of the gaze-related information allows the information processing device according to the present embodiment to obtain one or both of the estimated gaze direction and the estimated gaze position as a result obtained by estimating the user's line of sight.

Examples of the head detection result according to the present embodiment include information indicating one or both of the detected head position and orientation of the face. The head detection result according to the present embodiment is acquired by, in one example, methods described below. Moreover, the method of acquiring the head detection result according to the present embodiment is not limited to the example described below and may be acquired by any method capable of detecting (or estimating) the head.

Method of capturing the head with an image capturing device installed in the surroundings and detecting it using a captured image (e.g., motion capture technique, etc.)

Method of capturing surroundings with an image capturing device attached to the head side and detecting it using a captured image (e.g., a method of detecting it by capturing a marker installed in the surroundings, simultaneous localization and mapping (SLAM), etc.)

Method of detecting it with a motion sensor attached to the head side (e.g., one or more of an accelerometer, an angular rate sensor, and a geomagnetic field sensor)

Further, the processing regarding acquisition of the head detection result, such as processing of a captured image and processing of detection data of motion sensor, may be performed by, in one example, the information processing device according to the present embodiment or an external device of the information processing device according to the present embodiment. In a case where the processing regarding the acquisition of the head detection result is performed in the external device, the information processing device according to the present embodiment uses the head detection result obtained from the external device for the processing regarding the information processing method according to the present embodiment.

Examples of the line-of-sight detection result according to the present embodiment include information indicating the optical axis of the user (e.g., data indicating the optical axis vector, etc.). The line-of-sight detection result according to the present embodiment is acquired by, in one example, methods described below. Moreover, the method of acquiring the line-of-sight detection result according to the present embodiment is not limited to the examples described below and may be acquired by any method capable of detecting (or estimating) the line of sight.

Corneal Reflex based on a captured image obtained by capturing eyes

Method of estimation from a pupil shape detected from a captured image obtained by capturing eyes Method of estimation from the positional relationship between the pupil and the eyelid detected from a captured image obtained by capturing eyes Method of estimation from the relationship between the white of the eye and the black of the eye detected from the captured image obtained by capturing eyes Method of estimation from muscle electric potential of the eyeball detected by the electromyograph that detects muscle electric potential of the eyeball Further, the processing regarding the acquisition of the line-of-sight detection result, such as the processing of the captured image or the processing of the detection data of the electromyograph, may be performed by the information processing device according to the present embodiment or may be performed in an external device of the information processing device according to the present embodiment. In the case where the processing regarding the acquisition of the line-of-sight detection result is performed in the external device, the information processing device according to the present embodiment uses the line-of-sight detection result acquired from the external device for the processing regarding the information processing method according to the present embodiment.

Figure 3:
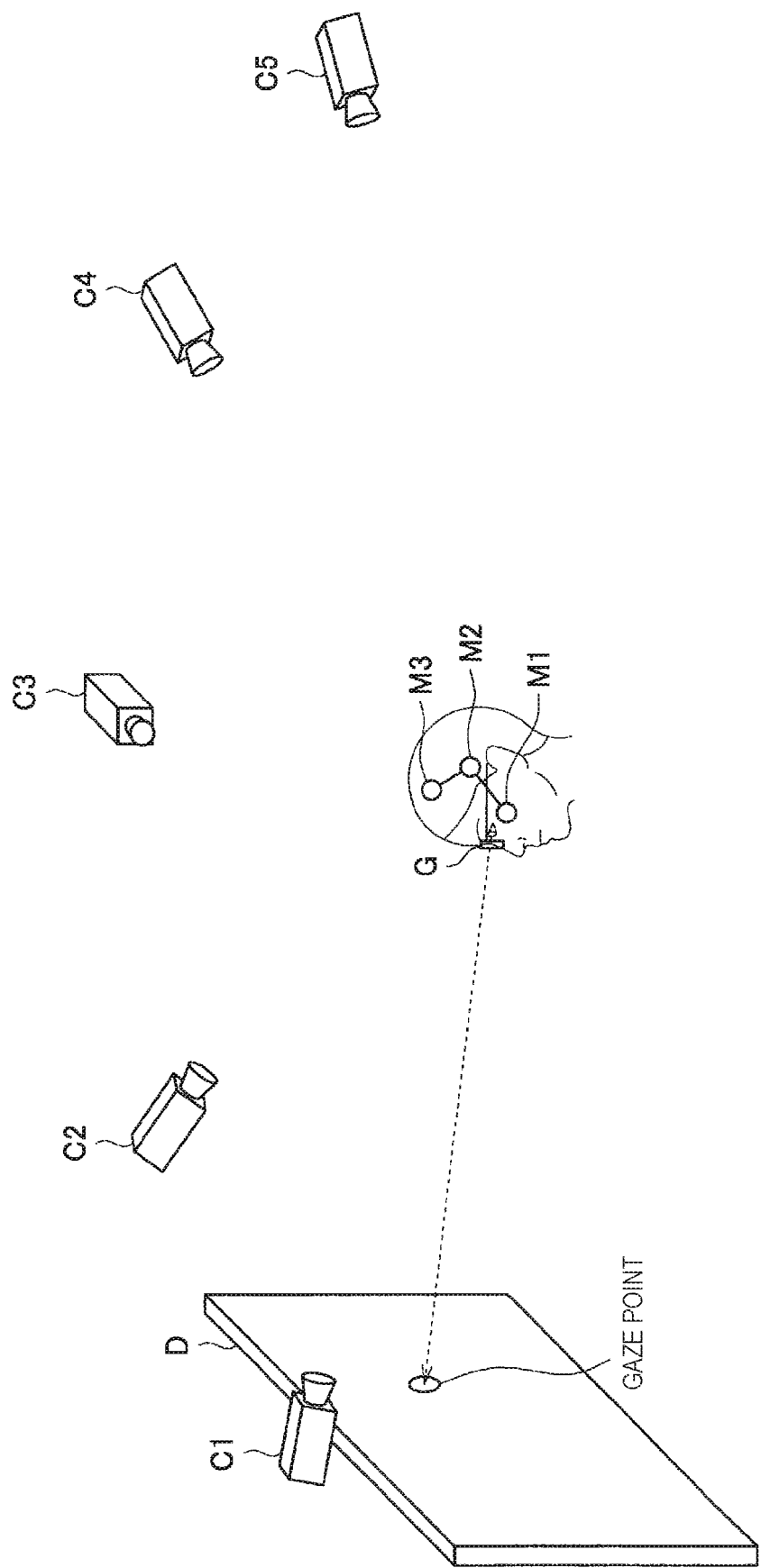
FIG. 3 is a diagram illustrated to describe an information processing method according to the present embodiment.
Figure 4:
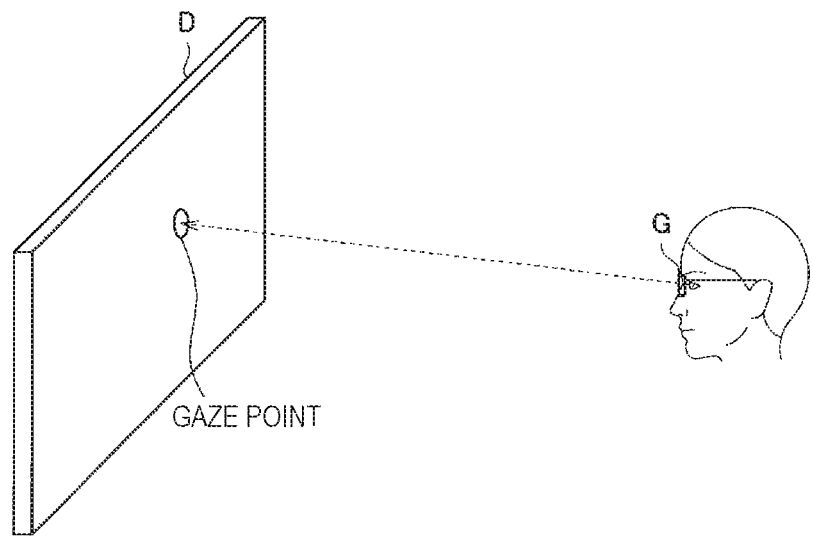
FIG. 4 is a diagram illustrated to describe an information processing method according to the present embodiment.

FIGS. 3 and 4 are diagrams illustrated to describe the information processing method according to the present embodiment and illustrate an example of a device regarding the acquisition of the detection result of the user's head and the detection result of the user's line of sight. FIGS. 3 and 4 illustrate a case where the user is viewing the display screen D.

FIG. 3 illustrates "an example in which the line-of-sight detection result is obtainable by the corneal reflex using a captured image captured by a glasses type eyewear G including the image capturing device for detection of line of sight configured to capture the user's eye", in one example. In addition, FIG. 3 illustrates "an example in which the head detection result is obtainable using the motion capture technique using a captured image obtained by capturing markers M1, M2, M3, and so on worn on the user's head by image capturing devices C1, C2, C3, C4, C5, and so on arranged in the surroundings", in one example.

In the example illustrated in FIG. 3, it is possible to improve in the accuracy of the head detection and the accuracy in the gaze detection by, in one example, the studies described below.

To adjust the installation position and angle of the marker

To select a captured image of the image capturing device that is predicted to have the highest accuracy from among captured images obtained by capturing by the image capturing devices C1, C2, C3, C4, C5, and so on at each time point To guide the standing position and face direction of the user to a place where it is possible to ensure the accuracy FIG. 4 illustrates the "example in which the line-of-sight detection result is obtainable by the corneal reflex using a captured image captured by the glasses type eyewear G including the image capturing device for detection of the line of sight used to capture the user's eye", in one example, which is similar to the example illustrated in FIG. 3. In addition, FIG. 4 illustrates "an example of detection using self-position identification based on a captured image captured by an image capturing device (not shown) installed in the surroundings", in one example.

More specifically, the information processing device according to the present embodiment calibrates the line-of-sight detection result on the basis of the calibration information corresponding to a predetermined angle of the eye.

Then, the information processing device according to the present embodiment acquires the gaze-related information on the basis of the head detection result and the calibrated line-of-sight detection result. Examples of the calibrated line-of-sight detection result include information indicating the visual axis estimated on the basis of the optical axis (e.g., data indicating the visual axis vector, etc.).

The calibration information corresponding to the predetermined angle of the eye is acquired on the basis of the head detection result and the line-of-sight detection result by, in one example, the guidance processing to be described later.

Here, the predetermined angle of the eye according to the present embodiment is determined by, in one example, setting a range for use of the line of sight (hereinafter referred to as "line-of-sight use range") in a state in which the user'S head is stationary. In a case where the orientation of the user's face is changed, the line-of-sight use range follows in accordance with the orientation of the face. In addition, the line-of-sight use range is relevant to the swing width of the eye.

Figure 5:
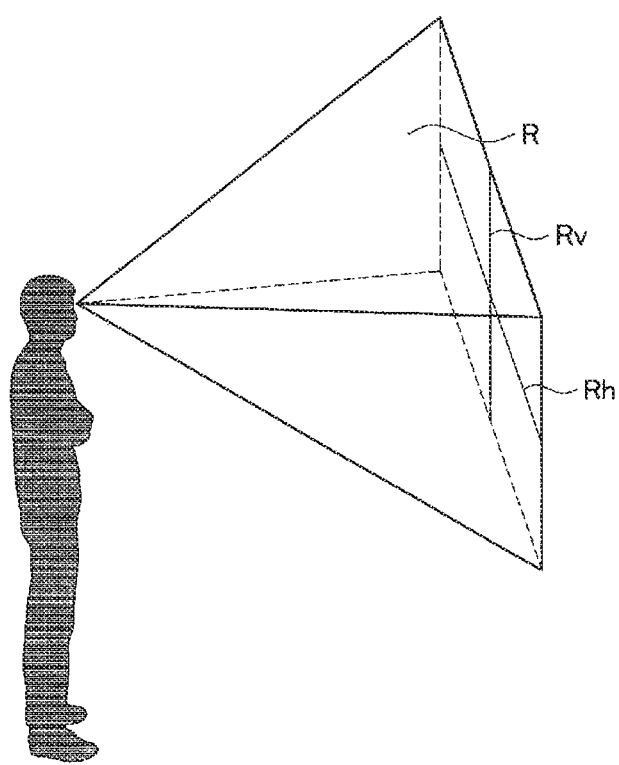
FIG. 5 is a diagram illustrated to describe an example of a line-of-sight use range according to the present embodiment.

FIG. 5 is a diagram illustrated to describe an example of a line-of-sight use range R according to the present embodiment. As illustrated in FIG. 5, the line-of-sight use range R is defined by a line-of-sight use range Rh in the vertical direction and a line-of-sight use range Rv in the horizontal direction.

The predetermined angle of the eye according to the present embodiment is relevant to, in one example, the angle of the eye when the eye is moved from the center position of the line-of-sight use range R to the position of the vertex of the line-of-sight use range R.

An example of a method of setting the line-of-sight use range R is now described.

Figure 6:
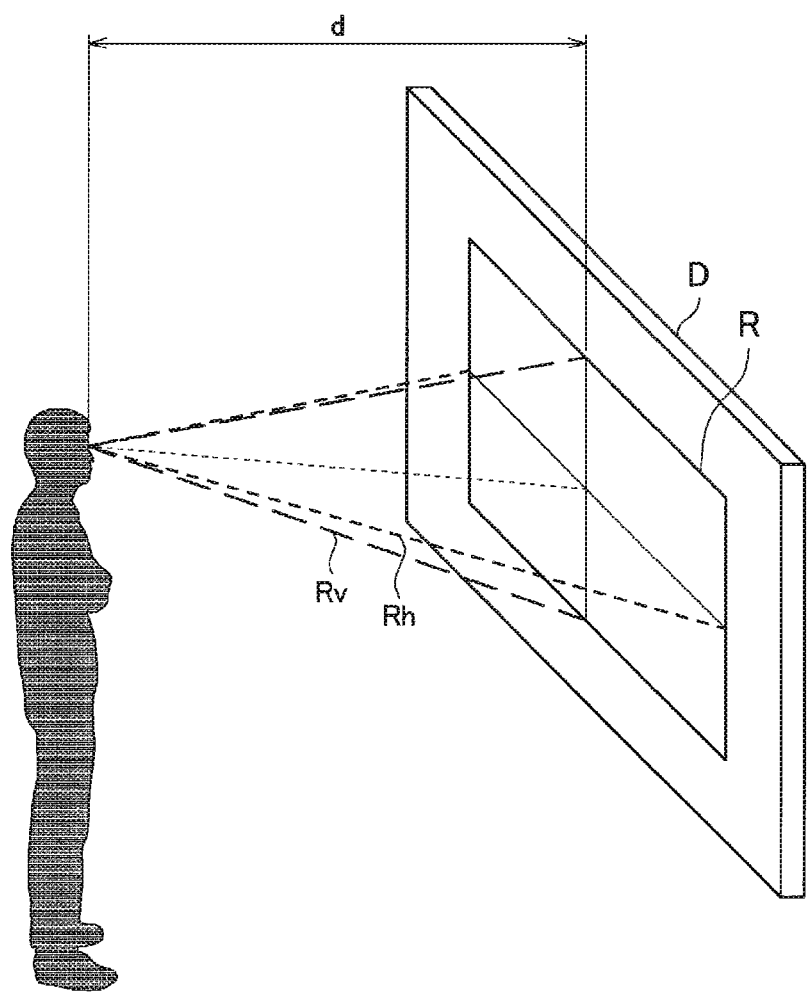
FIG. 6 is a diagram illustrated to describe an example of a method of setting a line-of-sight use range according to the present embodiment.

FIG. 6 is a diagram illustrated to describe an example of a method of setting the line-of-sight use range R according to the present embodiment. FIG. 6 illustrates an example of a method of setting the line-of-sight use range R on a display screen of a display device, a display screen projected on the wall, or the like.

The line-of-sight use range R is set on the basis of, in one example, a line-of-sight use range on the display screen D and a distance d between the position of the user's face and the display screen D. In one example, the information processing device according to the present embodiment sets the line-of-sight use range R by referring to a table (or a database) in which the size of the line-of-sight use range, distance, and the size of the line-of-sight use ranges R are associated with each other. Moreover, the information processing device according to the present embodiment may set the line-of-sight use range R by any algorithm capable of setting the line-of-sight use range R by using the line-of-sight use range and the distance d.

The line-of-sight use range on the display screen D is determined by, in one example, an entire rendering area on the display screen D, a range corresponding to the size of software window, a range corresponding to the size regarding a user interface (hereinafter sometimes referred to as "UI") such as the size of a menu, or the like. In addition, examples of the position of the face of the user include the position indicated by the head detection result at a certain time point. In addition, the distance d may be a fixed value that is set, or may be a value (or a value estimated by any method) detected by any method such as a method using a distance sensor or the like.

Figure 7:
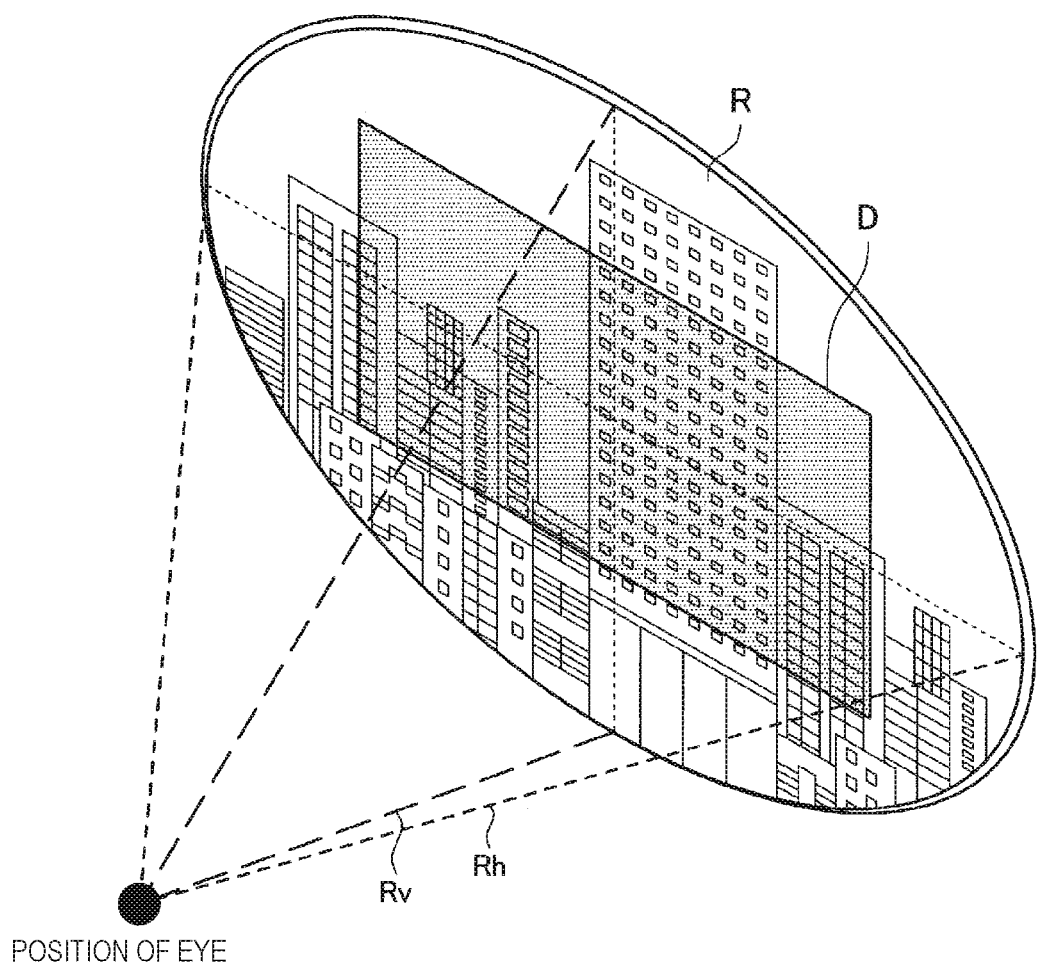
FIG. 7 is a diagram illustrated to describe another example of a method of setting a line-of-sight use range according to the present embodiment.

FIG. 7 is a diagram illustrated to describe another example of the method of setting the line-of-sight use range R according to the present embodiment. FIG. 7 illustrates an example of a method of setting the line-of-sight use range R on the display screen of a wearable device worn on the head of the user, such as head-mounted display or eyewear.

FIG. 7 illustrates an example in which the wearable device worn on the head is a see-through wearable device in which the user wearing it is capable of viewing the real space together with the image displayed on the display screen. Moreover, in a case where the wearable device worn on the head is an opaque wearable device in which the user wearing it is incapable of viewing the real space together with the image displayed on the display screen, the line-of-sight use range R is set in a similar method to that of FIG. 6.

In the case where the display screen D is the display screen of the see-through wearable device, in one example, as illustrated in FIG. 7, a field of view that is capable of viewing through a frame of a wearable device larger than the display screen D or through a lens of the wearable device is set as the line-of-sight use range R.

The line-of-sight use range R is set, in one example, by the method described with reference to FIGS. 6 and 7. Moreover, it is apparent that the method of setting the line-of-sight use range R is not limited to the method described with reference to FIGS. 6 and 7. In addition, the line-of-sight use range R is adjustable after being set, as described later.

As described above, the information processing device according to the present embodiment calibrates the line-of-sight detection result on the basis of the calibration information corresponding to the predetermined angle of the eye according to the present embodiment. In addition, the predetermined angle of the eye according to the present embodiment is determined on the basis of the line-of-sight use range that is a range for using the line of sight in a state in which the user's head is stationary.

Thus, the information processing device according to the present embodiment compares between pieces of calibration information corresponding to the cases where the swing width of the user's eyes is too large, the swing width of the user's eyes is too small, or the swing width of the user's eyes is biased, and uses the calibration information capable of further improving the accuracy in estimating the user's line of sight, thereby calibrating the line-of-sight detection result.

Thus, it is possible for the information processing device according to the present embodiment to improve the accuracy in estimating the user's line of sight by performing the processing regarding the information processing method according to the present embodiment.

Further, the improvement of the accuracy in estimating the user's line of sight is achievable, and so it is possible to use stably the user's line of sight to the intended level of accuracy.

[3-2] Other Processing Regarding Information Processing Method According to Present Embodiment Moreover, the processing regarding the information processing method according to the present embodiment is not limited to the processing described above. Other processing regarding the information processing method according to the present embodiment is now described. The information processing device according to the present embodiment is capable of performing one or both of processing operations indicated in items (1) and (2) below, in one example, as the processing regarding the information processing method according to the present embodiment.

(1) Guidance Processing

In a case of acquiring the calibration information, the information processing device according to the present embodiment performs guidance processing for guiding the user in such a manner that the angle of the user's eye may be a predetermined angle.

Figure 8B:
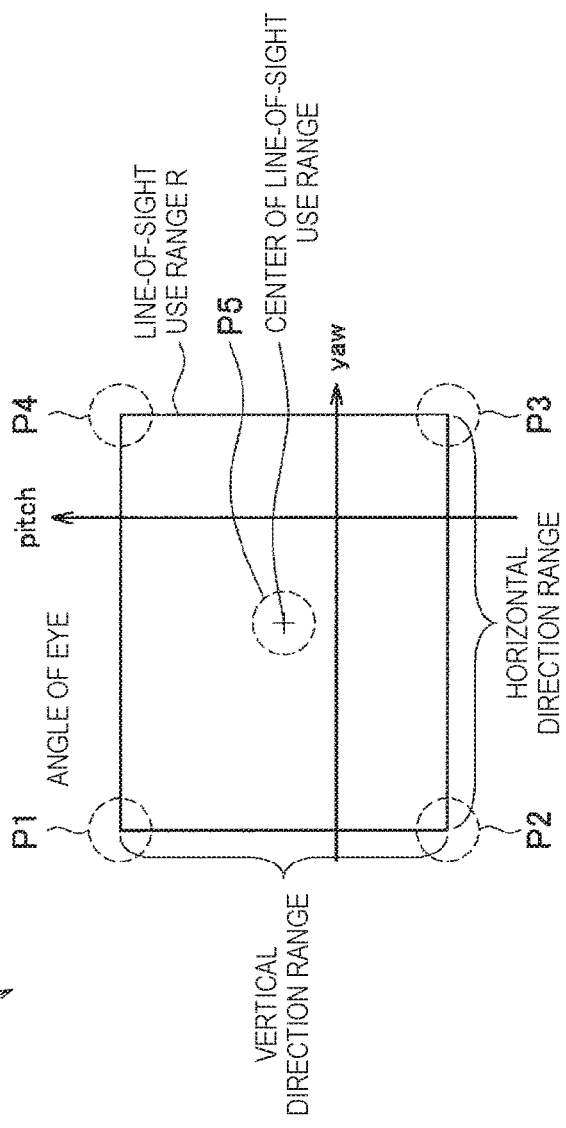
FIGS. 8A and 8B are diagrams illustrated to describe guidance processing regarding the information processing method according to the present embodiment.
Figure 8A:
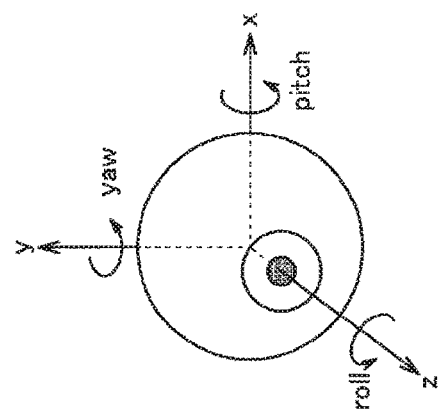

FIGS. 8A and 8B are diagrams illustrated to describe the guidance processing regarding the information processing method according to the present embodiment.

In FIGS. 8A and 8B, FIG. 8A illustrates an example of the coordinate system of the eye, and FIG. 8A illustrates the right-handed coordinate system. In addition, FIG. 8B illustrates an example of the set line-of-sight use range R and guidance points P1, P2, P3, P4, and P5 for the angle of the eye corresponding to the line-of-sight use range R. Examples of the guidance point of the angle of the eye include the positions of the vertices of the line-of-sight use range R, for example, the guidance points P1, P2, P3, and P4 illustrated in FIG. 8B. The guidance point of the angle of the eye may be the center position of the line-of-sight use range R (or, any position within the line-of-sight use range R), for example, the guidance point P5 illustrated in FIG. 8B. In addition, the guidance point of the angle of the eye is not limited to one point, and may be an area that includes the position of the vertex of the line-of-sight use range R and the center position of the line-of-sight use range R. The guidance point of the angle of the eye is referred to as "guidance area" in some cases.

FIGS. 9, 10A, 10B, 10C, 11, and 12 are diagrams illustrated to describe a procedure of acquisition of calibration information by performing the guidance processing according to the present embodiment. The procedure of acquiring the calibration information by performing the guidance processing is now described with reference to FIGS. 9, 10A, 10B, 10C, 11, and 12 as appropriate.

Figure 9:
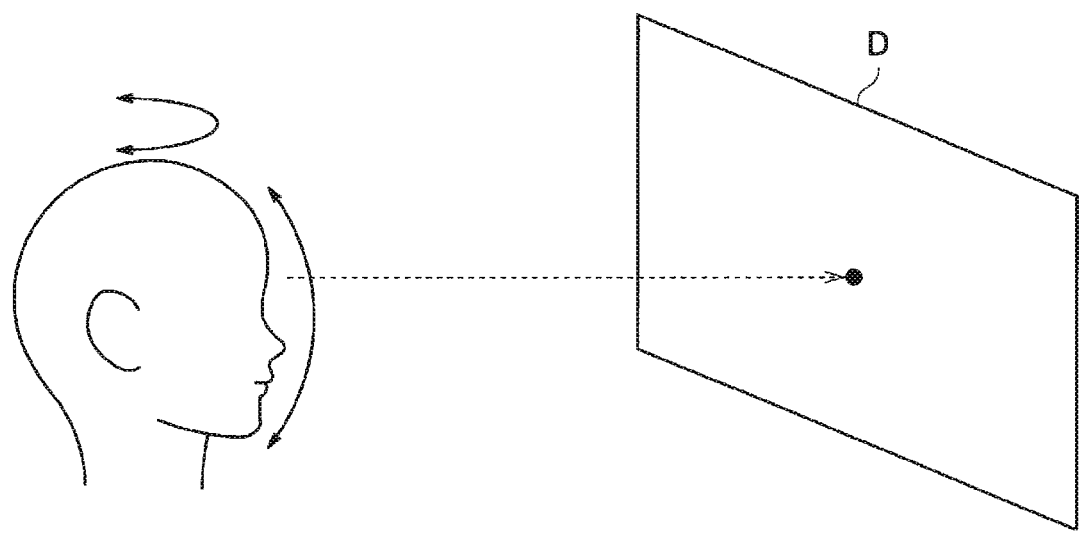
FIG. 9 is a diagram illustrated to describe a procedure of acquiring calibration information by performing guidance processing according to the present embodiment.

As illustrated in FIG. 9, the information processing device according to the present embodiment guides the orientation of the user's face in a state in which the user is caused to gaze at one point on the display screen D.

Here, examples of one point on the display screen D at which the information processing device according to the present embodiment causes the user to gaze include the center position of the line-of-sight use range R. Moreover, it is apparent that one point on the display screen D at which the information processing device according to the present embodiment causes the user to gaze is not limited to the center position of the line-of-sight use range R.

Further, the information processing device according to the present embodiment causes the user to gaze at one point on the display screen D by displaying a marker (an example of a predetermined object described later) on the display screen D. The information processing device according to the present embodiment causes the marker to be displayed on the display screen D by transmitting a control signal including a display instruction to a display device or an image projection device.

Figure 10:
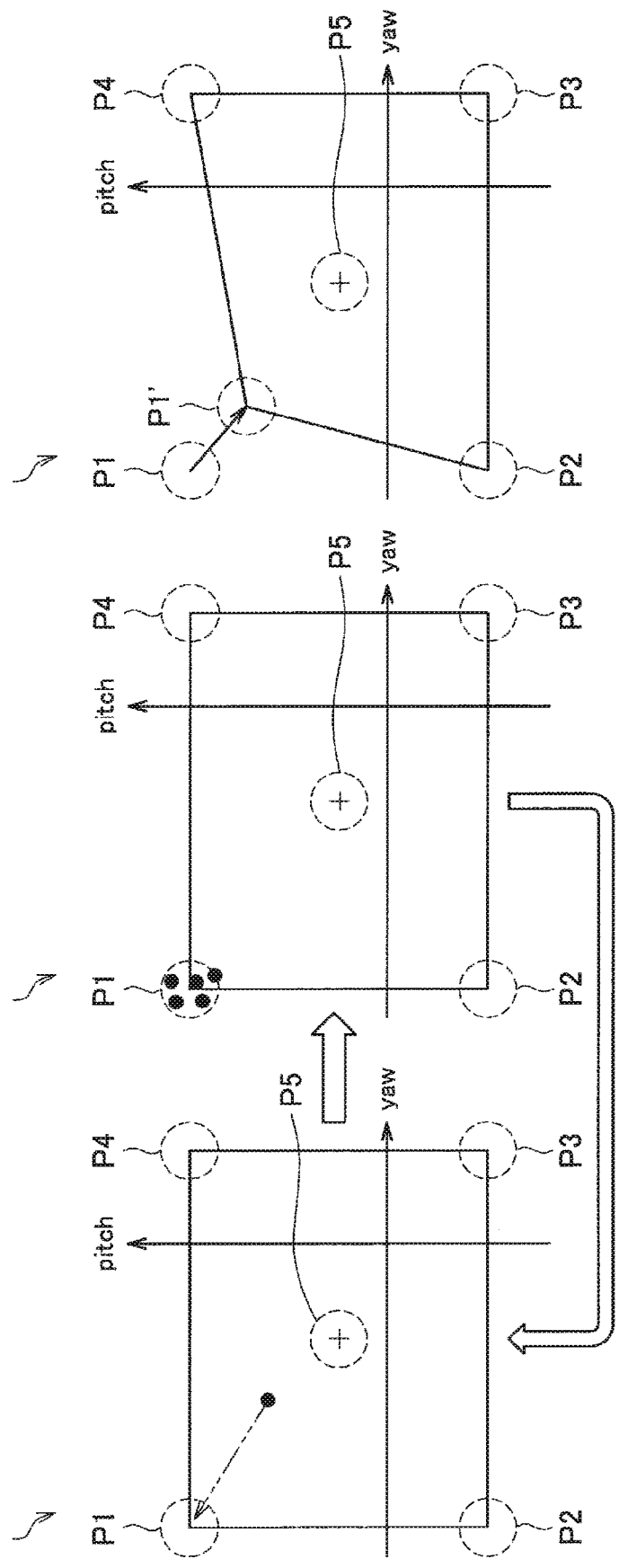
FIGS. 10A, 10B, and 10C are diagrams illustrated to describe a procedure of acquiring calibration information by performing guidance processing according to the present embodiment.

In FIGS. 10A, 10B, and 10C reference numeral P illustrated in FIG. 10A indicates an example of the angle of the eye when the user is gazing at the marker on the display screen D. The information processing device according to the present embodiment guides the angle of the eye to a predetermined angle by guiding the orientation of the face while gazing at the marker. FIG. 10A illustrates an example in which the angle of the eye is guided to the guidance point P1.

As illustrated in FIG. 10B, when the angle of the eye is guided to the guidance point P1, the information processing device according to the present embodiment samples data in a state of being guided to the guidance point P1. In one example, in a case where the preset number of data items is obtained, the information processing device according to the present embodiment determines that sampling of data at the guidance point P1 is completed.

When the sampling of data at the guidance point P1 is completed, the data is guided to another guidance point and sampling for the data is performed at each guidance point.

Moreover, in the case where it is determined that the guidance fails to be performed such as when the angle of the eye is too large to detect the line of sight, the information processing device according to the present embodiment is capable of changing the guidance point in such a manner that the guidance range for guiding the user is reduced, as illustrated in FIG. 10C. In the case where the guidance point is changed in such a manner that the guidance range for guiding the user is reduced, the line-of-sight use range is smaller than the line-of-sight use range that is initially set. FIG. 10C illustrates an example in which the information processing device according to the present embodiment changes the guidance point P1 to a guidance point P1' such that the guidance range for guiding the user is reduced.

Figure 11:
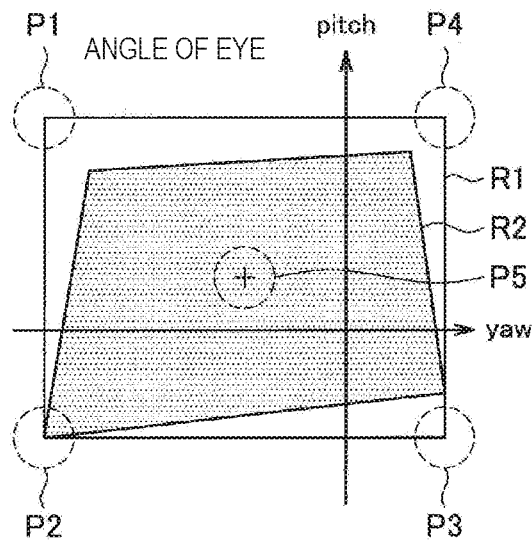
FIG. 11 is a diagram illustrated to describe a procedure of acquiring calibration information by performing guidance processing according to the present embodiment.

FIG. 11 illustrates an example of the line-of-sight use range after performing the calibration. In FIG. 11, R1 indicates the set line-of-sight use range, and R2 illustrated in FIG. 11 indicates the line-of-sight use range in which the calibration can be performed actually.

As illustrated with reference to FIG. 10C, in the case where the guidance point is changed, the line-of-sight use range is smaller than the line-of-sight use range that is initially set. The determination of the angle of the eye used in the software that uses the gaze-related information based on the line-of-sight use range R2 makes it possible to secure the accuracy in estimating the line of sight in the software.

Figure 12:
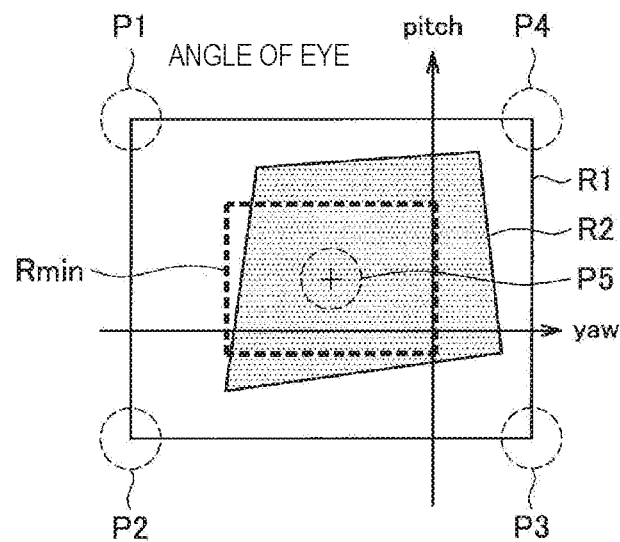
FIG. 12 is a diagram illustrated to describe a procedure of acquiring calibration information by performing guidance processing according to the present embodiment.

Further, FIG. 12 illustrates another example of the line-of-sight use range after performing the calibration. In FIG. 12, R1 indicates the line-of-sight use range that is set, and R2 illustrated in FIG. 12 indicates the line-of-sight use range in which the calibration can be performed actually. In addition, Rmin illustrated in FIG. 12 indicates the minimum range of the line-of-sight use range that is set.

In this regard, the minimum range Rmin of the line-of-sight use range is, in one example, a line-of-sight use range that is set to secure the accuracy in estimating the line of sight. The minimum range Rmin of the line-of-sight use range may be a fixed line-of-sight use range that is previously set, or may be a variable line-of-sight use range that is changeable on the basis of a user operation or the like. In addition, the minimum range Rmin of the line-of-sight use range may be set for each piece of software that uses the gaze-related information.

In the case where the guidance point is changed as illustrated with reference to FIG. 10C, there may be case where the line-of-sight use range R2 in which the calibration can be performed actually does not satisfy the minimum range Rmin of the line-of-sight use range as illustrated in FIG. 12. In this case, the accuracy in estimating the line of sight may be likely to fail to be secured.

Thus, in the case where the line-of-sight use range R2 does not satisfy the minimum range Rmin, the information processing device according to the present embodiment may perform the processing described below as exception processing.

Retry calibration. In this event, in a case where a wearable device to be worn on the head is used, the information processing device according to the present embodiment may prompt the user to check a state in which the wearable device is worn, in one example, using one or both of image and sound.

Terminate calibration and prevent use of gaze-related information for software. In this event, the information processing device according to the present embodiment may cause the user to be notified that the line of sight fails to be used by one or both of the display of a screen indicating the error and the output of sound indicating the error.

Moreover, the exception processing in the case where the line-of-sight use range R2 does not satisfy the minimum range Rmin is not limited to the above example.

In one example, the information processing device according to the present embodiment is also capable of terminating the calibration and causing the gaze-related information to be used for software without any modification. In this event, the information processing device according to the present embodiment may change the UI to be displayed if deterioration in the accuracy in estimating the line of sight is expected. Examples of modification of the UI include the reduction of the number of display objects, the increase in the size of the object, or the like, in the case of a UI allowing a menu object to be selected by a line of sight.

Further, the information processing device according to the present embodiment may exchange between the exception processing as described above on the basis of a result obtained by comparing the line-of-sight use range R2 with the minimum range Rmin. The information processing device according to the present embodiment exchanges between the exception processing, in one example, by threshold processing, which uses the size of a region where the line-of-sight use range R2 does not satisfy the minimum range Rmin and one or more thresholds.

More specifically, examples of the guidance processing according to the present embodiment include one processing of processing operations described in items (1-1) to (1-4) below or processing in which, among these processing operations, two or more combinable processing operations are combined.

(1-1) First Example of Guidance Processing

The information processing device according to the present embodiment guides the user in such a manner that the user changes the orientation of the face while viewing a predetermined object to be displayed on the display screen.

The information processing device according to the present embodiment guides a user using one or more of a visual guidance method, an auditory guidance method, and a tactile guidance method. In one example, examples of guidance by the guidance processing according to the first example include examples indicated in items (A) to (D) below.

(A) Example of Visual Guidance

The information processing device according to the present embodiment, in one example, performs guidance for the user by displaying an indicator object used to indicate the orientation of the face on the display screen as a predetermined object.

Examples of the indicator object include an object used to indicate the orientation of the face with an arrow, an object used to indicate the orientation of the face by a model indicating the orientation of the face, or an object obtained by a combination thereof. Moreover, the indicator object according to the present embodiment is not limited to the example described above and may be any object capable of indicating the orientation of the face by being displayed on the display screen.

FIGS. 13A, 13B, and 13C are diagrams illustrated to describe the guidance processing regarding the information processing method according to the present embodiment, and illustrates an example of the visual guidance. FIGS. 13A, 13B, and 13C illustrate an example of a case where a user is guided by the display on the display screen D, and illustrates an example of guiding the user using an indicator object used to indicate the orientation of the face with an arrow. In FIGS. 13A 13B, and 13C, FIG. 13A illustrates an example of a guide screen for guidance. FIG. 13B illustrates an example of the guidance screen using the indicator object, and FIG. 13C illustrates another example of the guidance screen using the indicator object.

In a case where the guidance screen illustrated in FIG. 13B is displayed as an example, after the guide screen (illustrated in FIG. 13A) is displayed on the display screen D, the guidance screen illustrated in FIG. 13B is displayed. In FIGS. 13A, 13B, and FIG. 13B illustrates an example where an indicator object M1 is displayed at the position of the display screen where the user is viewing continuously while moving the face.

The direction of the arrow indicated by the indicator object M1 in FIGS. 13A, 13B, and 13C changes, in one example, in such a manner that the angle of the eye falls within the guidance area (the guidance point of the angle of the eye). In addition, in a case where it is unnecessary for the user to move the face, the indicator object is changed to an object that does not indicate a direction, as shown by M2 in FIGS. 13A, 13B, and 13C.

In a case where a predetermined number of sampling operations is completed in the guidance area and another guidance area is present, guidance to the other guidance area is performed.

Further, in the case where the guidance screen illustrated in FIG. 13C is displayed as an example, after the guide screen (FIG. 13A) is displayed on the display screen D, the guidance screen illustrated in FIG. 13C is displayed. FIG. 13C illustrates an example in which the indicator object M1 is displayed at the position of the display screen corresponding to each of the guidance areas (guidance points of the angle of the eye).

The guidance method using the indicator object in the case where the guidance screen illustrated in FIG. 13C is displayed is similar to the case where the guidance screen illustrated in FIG. 13B is displayed.

FIGS. 14A, 14B, and 14C are diagrams illustrated to describe the guidance processing regarding the information processing method according to the present embodiment and illustrates another example of the visual guidance. FIGS. 14A, 14B, and 14C illustrate another example in the case of guiding the user by the display on the display screen D, and illustrates an example of guiding the user by an indicator object used to indicate the orientation of the face by a model indicating the orientation of the face. In FIGS. 14A, 14B, and 14C, FIG. 14A illustrates an example of a guide screen for guidance. In FIGS. 14A, 14B, and 14C, FIG. 14B illustrates an example of the guidance screen using the indicator object, and FIG. 14C illustrates another example of the guidance screen using the indicator object.

In the case where the guidance screen illustrated in FIG. 14B is displayed as an example, after the guide screen (illustrated in FIG. 14A) is displayed on the display screen D, the guidance screen illustrated in FIG. 14B is displayed. In FIGS. 14A, 14B, and 14C, FIG. 14B illustrates an example in which the indicator object M1 is displayed at the position of the display screen where the user is viewing continuously while moving the face.

The orientation of the face of the model indicated by the indicator object M1 in FIGS. 14A, 14B, and 14C is changed in such a manner that the angle of the eye falls within the guidance area (the guidance point of the angle of the eye), in one example, as indicated by M2 in FIGS. 14A, 14B, and 14C. In addition, in a case where it is not necessary to move the face of the user, the indicator object is changed to, in one example, a model facing the front or an object that does not indicate the direction as indicated by M2 in FIGS. 13A, 13B, and 13C.

Further, an object M3 indicating the current orientation of the user' face may be displayed on the display screen D in addition to the indicator object M1 as in the guidance screen illustrated in FIG. 14C. In FIGS. 14A, 14B, and 14C, FIG. 14C illustrates an example in which the indicator object M1 and the front-facing object M3 are displayed while being superimposed on each other. The display as illustrated in FIG. 14C makes it possible for the user to recognize both a target aiming at the face and the orientation of the user's face currently recognized. Thus, the display as illustrated in FIG. 14C allows a higher guidance effect to be achieved.

In the case where a predetermined number of sampling operations is completed in the guidance area and another guidance area is present, the guidance to the other guidance area is performed.

Moreover, the example of guiding the user by the indicator object used to indicate the orientation of the face by the model indicating the orientation of the face is not limited to the example illustrated in FIGS. 14A, 14B, and 14C.

In one example, in the case where the user is guided with an indicator object used to indicate the orientation of the face by a model indicating the orientation of the face, the indicator object M1 may be displayed at the position of a display screen corresponding to each of the guidance areas (guidance points of the angle of the eye), as illustrated in FIG. 13C.

Moreover, the processing regarding the visual guidance is not limited to the example described with reference to FIGS. 13A, 13B, 13C, 14A, 14B, and 14C.

In one example, in a case where the orientation of the face is no longer detected when the guidance is not completed, the information processing device according to the present embodiment may change the orientation of the face indicated by the indicator object.

Examples of changing the orientation of the face indicated by the indicator object include "setting the orientation of the face to be indicated to the orientation opposite to the guidance direction immediately before the orientation of the face is not detected", "changing the orientation of the face to be indicated to a particular pattern, for example, by turning the user's neck once", "randomly changing the orientation of the face to be indicated", and the like.

Figure 15A:
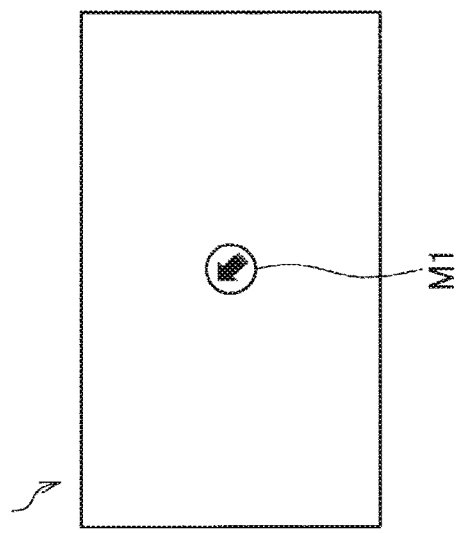
FIGS. 15A, 15B, and 15C are diagrams illustrated to describe guidance processing regarding the information processing method according to the present embodiment.
Figure 15B:
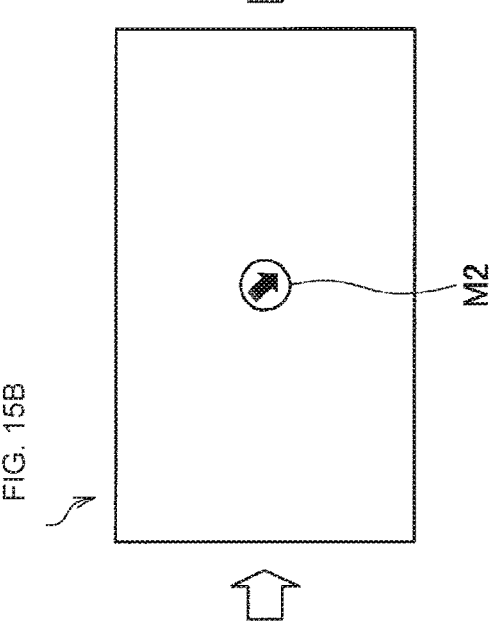
Figure 15C:
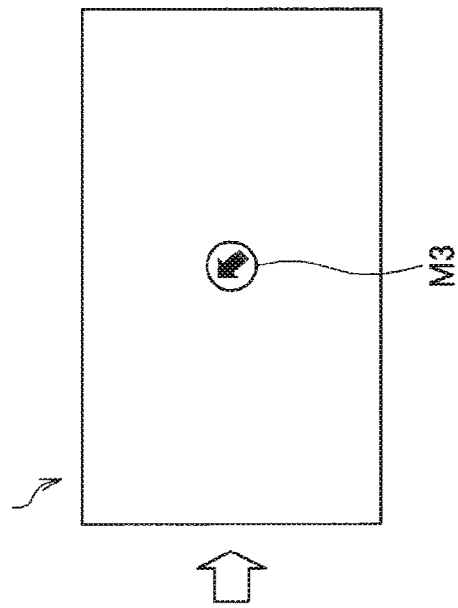

FIGS. 15A, 15B, and 15C are diagrams illustrated to describe the guidance processing regarding the information processing method according to the present embodiment, and illustrates a modification of the indicator object displayed on the display screen D in a case where the orientation of the face is no longer detected when the guidance is not completed.

In the case where the orientation of the face is no longer detected when the guidance is performing with the indicator object M1 illustrated in FIG. 15A, in one example, the information processing device according to the present embodiment changes the indicator object displayed on the display screen D to the indicator object M2 illustrated in FIG. 15B. Here, in FIGS. 15A, 15B, and 15C, FIG. 15B illustrates an example of a change to the indicator object M2 whose direction is opposite to the indicator object M1.

Further, in a case where the orientation of the face is detected again by a change to the indicator object M2, the information processing device according to the present embodiment causes an indicator object M3 used for guidance to the guidance area (guidance point of the angle of the eye) to be displayed.

The change in the orientation of the face indicated by the indicator object in the case where the orientation of the face is no longer detected when the guidance is not completed as described above makes it possible to further increase the possibility that the orientation of the user's face is detected again. Thus, the change in the orientation of the face indicated by the indicator object in the case where the orientation of the face is no longer detected when the guidance is not completed makes it possible to complete the guidance more reliably.

Further, in a case where the orientation of the face is detected again, the information processing device according to the present embodiment may reduce the guidance range for guiding the user. The information processing device according to the present embodiment changes the guidance point of the angle of the eye in such a manner that the guidance range for guiding the user is reduced, in one example, as illustrated with reference to FIG. 10C, thereby making the guidance range for guiding the user smaller.

Further, the information processing device according to the present embodiment may change the display position of an indicator object (an example of a predetermined object) in such a manner that the load on which the user moves the face is reduced on the basis of the result of comparison between the predetermined angle corresponding to the guidance area (guidance point of the angle of the eye) and the angle of the eye of the user. The information processing device according to the present embodiment changes the display position of an indicator object (a predetermined object) in such a manner that the difference between the predetermined angle and the angle of the user's eye is reduced.

Figure 16A:
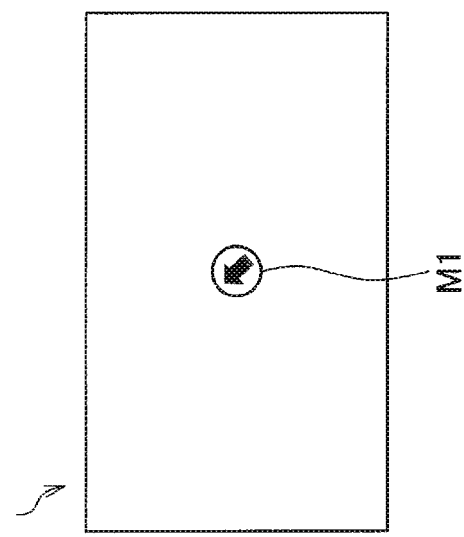
FIGS. 16A and 16B are diagrams illustrated to describe guidance processing regarding the information processing method according to the present embodiment.
Figure 16B:
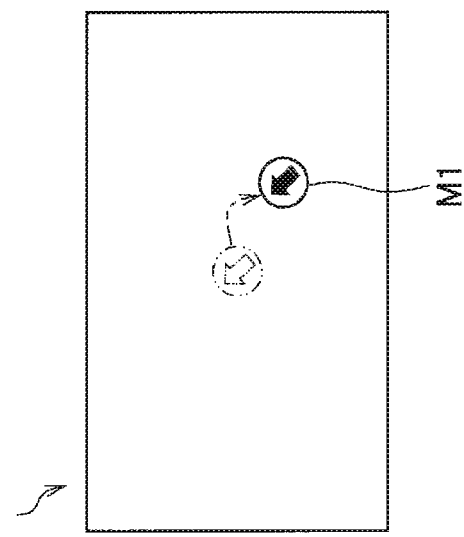

FIGS. 16A and 16B are diagrams illustrated to describe the guidance processing regarding the information processing method according to the present embodiment, and illustrates an example in which the display position of an indicator object to be displayed on the display screen D is changed to reduce the load on which the user moves the face.

In a case where the guidance is performed by the indicator object M1 as illustrated in FIG. 16A, the information processing device according to the present embodiment determines whether the angle of the user's eye falls within a predetermined range that is set for the guidance area (the guidance point of the angle of the eye). In one example, in a case where the difference value between the predetermined angle and the angle of the user's eye is smaller than the set threshold (or case where the difference value is equal to or less than the threshold), the information processing device according to the present embodiment determines that it falls within the predetermined range.

Then, in a case where it is determined that the angle of the user's eye falls within the predetermined range that is set for the guidance area, the information processing device according to the present embodiment changes the display position of the indicator object M1, as illustrated in FIG. 16B. The information processing device according to the present embodiment changes the display position of the indicator object M1 in such a manner that the angle of the user's eye approaches the guidance area (the guidance point of the angle of the eye).

In one example, as illustrated in FIGS. 16A and 16B, the change in the display position of the indicator object M1 makes it possible to further reduce the time until the guidance is completed when the angle of the user's eyes with respect to the guidance area (the guidance point of the angle of the eye) is slightly smaller. Thus, it is possible for the information processing device according to the present embodiment to reduce the load on which the user moves the face at the time of guidance.

(B) Example of Auditory Guidance

The information processing device according to the present embodiment guides the user, in one example, by causing sound that indicates the orientation of the face to be output from a sound output device such as a speaker.

FIGS. 17A, 17B, and 17C are diagrams illustrated to describe the guidance processing regarding the information processing method according to the present embodiment, and illustrates an example of auditory guidance. FIGS. 17A 17B and 17C illustrate an example in which a user is guided by sound indicating the orientation of the face. In FIGS. 17A, 17B, and 17C, FIG. 17A illustrates an example of a guide screen for guidance. In FIGS. 17A, 17B, and 17C, FIGS. 17B and 17C illustrate an example of a guidance screen.

The guide screen (A illustrated in FIG. 17A) is displayed on the display screen D, then the guidance screen illustrated in FIG. 17B is displayed and the sound indicating the orientation of the face is output as indicated by reference numeral S1 in FIG. 17B.

Further, the information processing device according to the present embodiment may cause the sound indicating the relationship between the guidance area (the guidance point of the angle of the eye) and the angle of the eye to be output, in one example, as indicated by reference numeral S2 in FIG. 17C. In this regard, examples of the sound indicating the relationship between the guidance area and the angle of the eye include sound in which the relation between the guidance area and the angle of the eye is represented as pitch of the sound. Examples thereof include "an example in which pitch of the sound "several short beeps (beep-beep-beep . . . )" is higher as the angle of the eye is approaching the guidance area, and continuous sound "one long beep (beeeeep)" is given when the angle of the eye falls within the guidance area.

In the case where a predetermined number of sampling operations is completed in the guidance area and another guidance area is present, the guidance to the other guidance area is performed.

Moreover, the processing regarding the auditory guidance is not limited to the example described with reference to FIGS. 17A, 17B, and 17C.

In one example, in a case where the angle of the eye falls within the guidance area, the information processing device according to the present embodiment may further perform vibration feedback by causing a vibration device having an actuator or the like worn on the head of the user to be vibrated.

Further, the information processing device according to the present embodiment may change the display position of a marker (an example of a predetermined object) to be continued to be viewed by the user as illustrated in FIGS. 17A, 17B, and 17C so that the load on which the user moves the face is reduced, on the basis of the result of comparison between the predetermined angle corresponding to the guidance area (the guidance point of the angle of the eye) and the angle of the eye of the user, which is similar to the above item (A).

(C) Example of Tactile Guidance

The information processing device according to the present embodiment may perform tactile guidance, in one example, using vibration feedback. Examples of the tactile guidance include "vibrating a vibration device corresponding to the direction to be guided in a case where a plurality of vibration devices respectively corresponding to the directions toward the face are worn on the user's head".

(D) Combination of Plurality of Guidance Methods

Further, the information processing device according to the present embodiment is also capable of performing the guidance by combining two or more of the guidance methods described in the above items (A) to (C).

In the guidance processing according to the first example, as described above, the user is guided to change the orientation of the face while viewing a predetermined object displayed on the display screen. In the case where the guidance processing according to the first example is performed, in one example, the user is not necessary to move the line of sight and the eye continues to view one point, so there is an advantage that it is possible to continuously sample the detection data for calibration calculation.

(1-2) Second Example of Guidance Processing

The information processing device according to the present embodiment guides the user by causing an object that follows the orientation of the face to be displayed on the display screen. The object following the orientation of the face is relevant to a predetermined object that causes the user to view continuously.

Figure 18:
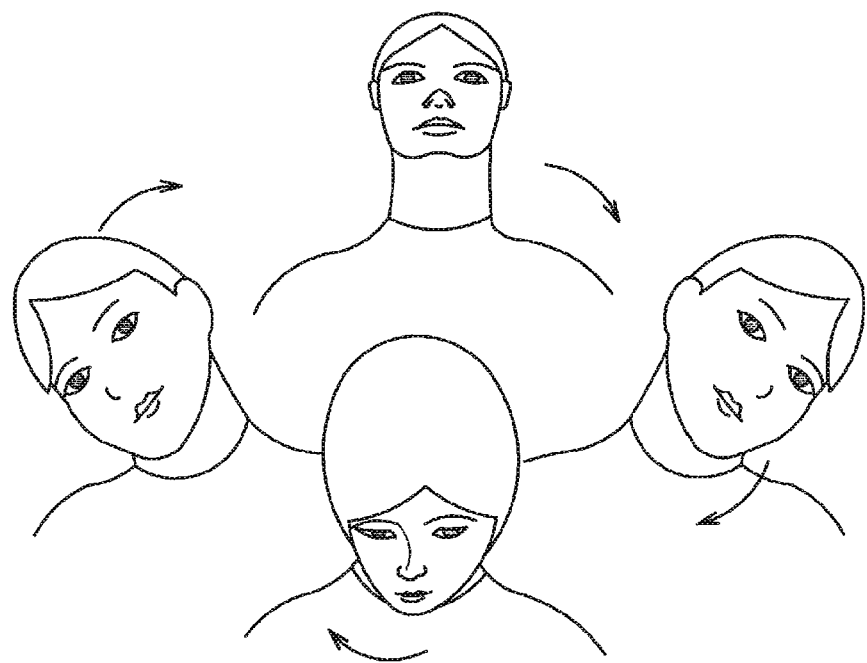
FIG. 18 is a diagram illustrated to describe guidance processing regarding the information processing method according to the present embodiment.

FIGS. 18, 19A, 19B, 20, 21A, 21B, 21C, 22A, 22B, and 22C are diagrams illustrated to describe the guidance processing regarding the information processing method according to the present embodiment. FIG. 18 illustrates an example of the user's movement in a case where the user moves the object following the orientation of the face. In addition, FIGS. 19A, 19B, 20, 21A, 21B, 21C, 22A, 22B, and 22C illustrate examples of the guidance performed by using an object following the orientation of the face displayed on the display screen D. An example of the guidance processing according to the second example is described below with reference to FIGS. 19A, 19B, 20, 21A, 21B, 21C, 22A, 22B, and 22C as appropriate.

Figure 19:
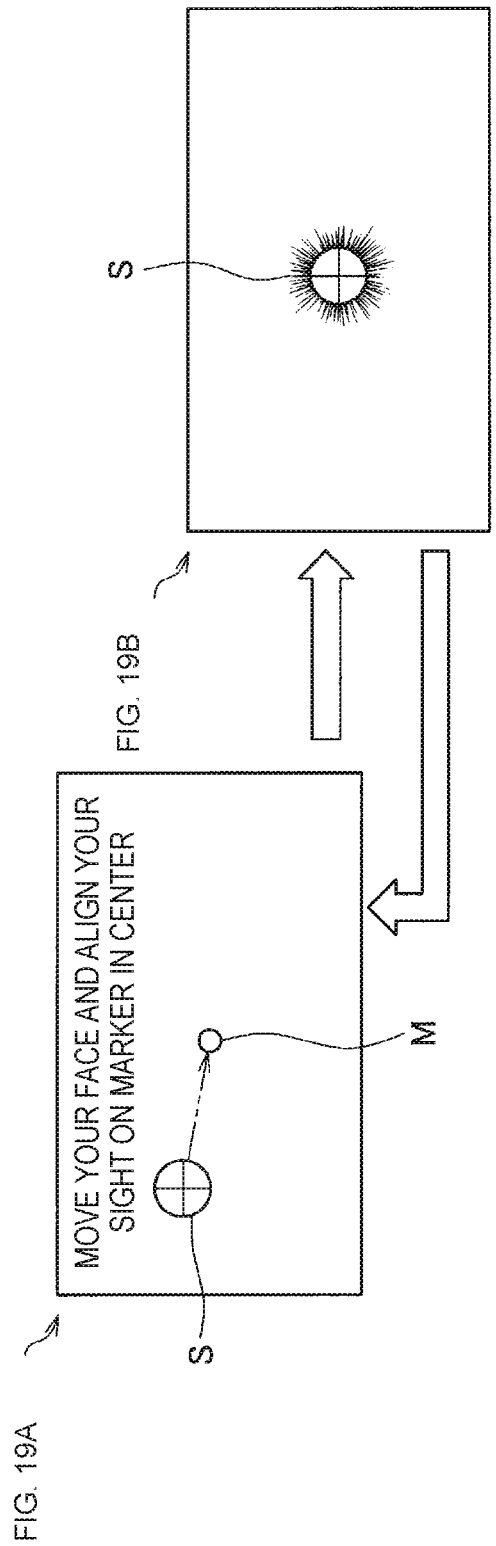
FIGS. 19A and 19B are diagrams illustrated to describe guidance processing regarding the information processing method according to the present embodiment.

(a) First Example of Guidance by Object Following Face Orientation (FIGS. 19A and 19B)

In FIGS. 19A and 19B, FIG. 19A illustrates an example of a guide screen for guidance. In FIGS. 19A and 19B, an object S is relevant to an object that follows the orientation of the face. In addition, in FIGS. 19A and 19B, a marker M is relevant to an object corresponding to the guidance area (the guidance point of the angle of the eye).

In the example illustrated in FIGS. 19A and 19B, data regarding the line of sight in a state where the object S and the marker M are aligned with each other is sampled as detection data for calibration calculation. Here, the reason for sampling the data when the object S and the marker M are aligned with each other is that there is a possibility that the user's line of sight moves between the object S and the marker M when the object S and the marker M are not aligned with each other.

Further, in a case where the object S and the marker M are aligned with each other, the information processing device according to the present embodiment may perform feedback for the user using, in one example, one or more of the visual method, the auditory method, and the tactile method. In FIGS. 19A and 19B, FIG. 19B illustrates an example in which feedback is made to the user using the visual method.

In the case where the predetermined number of sampling operations is completed in the marker M corresponding to the current guidance area and another guidance area is present, the marker M is displayed at a position corresponding to the other guidance area, and the guidance to the other guidance area is performed.

Figure 20:
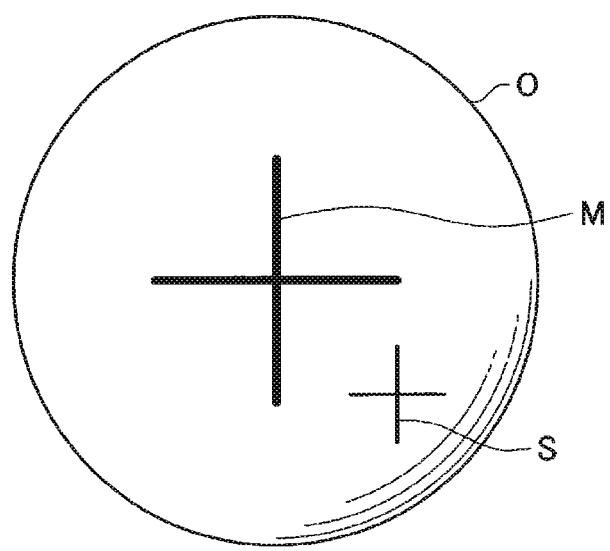
FIG. 20 is a diagram illustrated to describe guidance processing regarding the information processing method according to the present embodiment.

(b) Second Example of Guidance by Object Following Face Orientation (FIG. 20)

FIG. 20 illustrates an example in which data regarding the line of sight is sampled by moving a marker S on an object O, which rotates depending on the orientation of the face, to a target position M. In FIG. 20, the marker S is relevant to an object that follows the orientation of the face. In addition, in FIG. 20, the marker M is relevant to an object corresponding to the guidance area (the guidance point of the angle of the eye).

In the example illustrated in FIG. 20, the data regarding the line of sight in a state where the marker S and the marker M are aligned with each other is sampled as detection data for calibration calculation. In addition, in the case where the marker S and the marker M are aligned with each other, the information processing device according to the present embodiment may perform feedback for the user, in one example, using one or more of the visual method, the auditory method, and the tactile method.

Figure 21A:
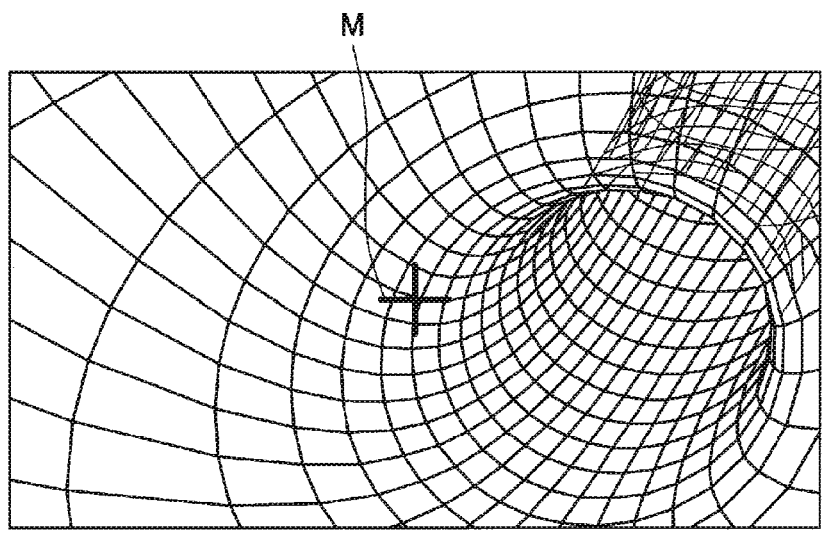
FIGS. 21A, 21B, and 21C are diagrams illustrated to describe guidance processing regarding the information processing method according to the present embodiment.
Figure 21B:
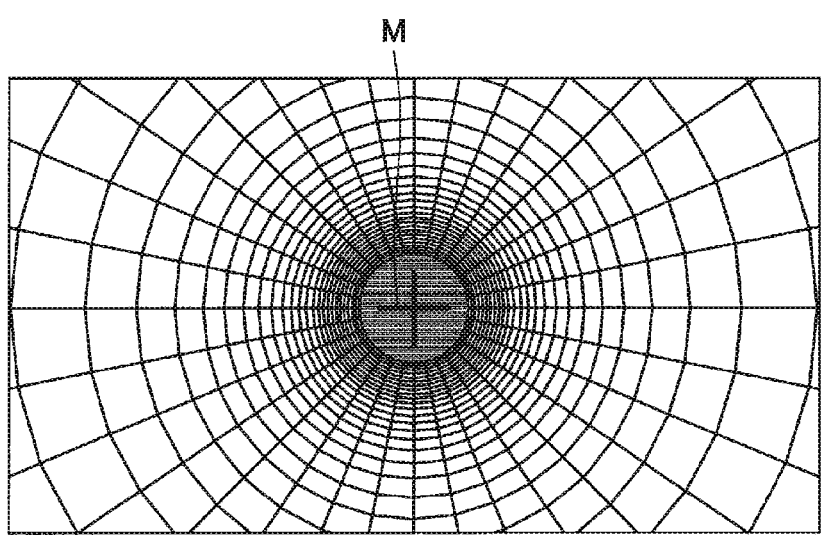
Figure 21C:
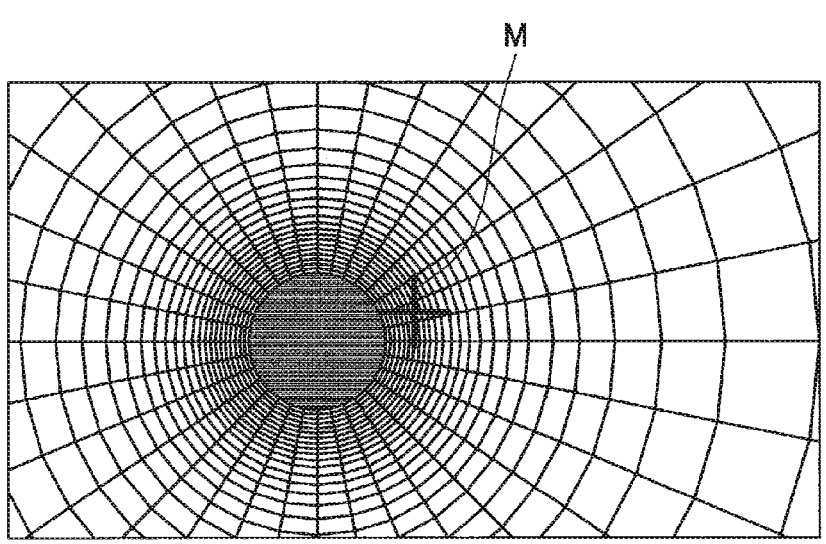

(c) Third Example of Guidance by Object Following Face Orientation (FIGS. 21A, 21B, and 21C)

FIGS. 21A, 21B, and 21C illustrate an example in which data regarding the line of sight is sampled by changing a tunnel display in such a manner that the end of the tunnel is visible at the position of the marker M using the tunnel display in which the curve changes according to the orientation of the face. In FIGS. 21A, 21B, and 21C, the tunnel display is relevant to an object that follows the orientation of the face. In addition, in FIGS. 21A, 21B, and 21C, the marker M is relevant to an object corresponding to the guidance area (the guidance point of the angle of the eye).

In the example illustrated in FIGS. 21A, 21B, and 21C, when the state in which the end of the tunnel is invisible as illustrated in FIG. 21A becomes the state in which the end of the tunnel is visible at the position of the marker M as illustrated in FIG. 21B, the data regarding the line of sight is sampled as detection data for calibration calculation. In addition, in the case where the state in which the end of the tunnel is visible at the position of the marker M, the information processing device according to the present embodiment may perform the feedback for the user, in one example, using one or more of the visual method, the auditory method, and the tactile method.

Further, as illustrated in FIG. 21C, in a case where the tunnel display is a state in which the end of the tunnel is visible but is not in a state in which the end of tunnel is invisible at the position of the marker M, the information processing device according to the present embodiment may guide the user's position (e.g., the standing position) in such a manner that the user's position is in the state in which the end of the tunnel is visible at the position of the marker M. The position of the user is estimated on the basis of, in one example, a captured image or the like captured by an image capturing device arranged in the surroundings. The information processing device according to the present embodiment guides the user's position, in one example, using one or more of the visual method, the auditory method, and the tactile method.

(d) Fourth Example of Guidance by Object Following Face Orientation (FIGS. 22A, 22B, and 22C)

FIGS. 22A, 22B, and 22C illustrate an example in which a trajectory S when the head is rotated is displayed on the display screen D as illustrated in FIG. 18 and the magnitude of the movement for rotating the head is made larger than that of the marker M1, thereby sampling the data regarding the line of sight. In FIGS. 22A, 22B, and 22C, the trajectory S is relevant to an object that follows the orientation of the face. In addition, in FIGS. 22A, 22B, and 22C, the marker M1 is relevant to an object corresponding to the guidance area (the guidance point of the angle of the eye).

The shape of the marker, which is an object corresponding to the guidance area (the guidance point of the angle of the eye), is set by the guidance point. In FIGS. 22A, 22B, and 22C, FIG. 22A illustrates, as an example of a marker that is an object corresponding to the guidance area (the guidance point of the angle of the eye), a marker M1 that is circular marker and a marker M2 that is rectangular marker.

In the example illustrated in FIGS. 22A, 22B, and 22C, when the state in which the magnitude of the movement for rotating the head is not larger than that of the marker M1 as illustrated in FIG. 22B becomes the state in which the magnitude of the movement for rotating the head is larger than that of the marker M1 as illustrated in FIG. 22C, the data regarding the line of sight is sampled as detection data for calibration calculation. Here, in the example illustrated in FIGS. 22A 22B, and 22C, the detection data for calibration calculation is continuously acquired.

Further, in the case where the magnitude of the movement for rotating the head is larger than that of the marker M1, the information processing device according to the present embodiment may perform the feedback for the user, in one example, using one or more of the visual method, the auditory method, and the tactile method. In FIGS. 22A, 22B, and 22C, FIG. 22C illustrates an example in which the state in which the magnitude of the movement for rotating the head is larger than that of the marker M1 is fed back to the user using the visual method.

Examples of the guiding processing according to the second example include the examples described in the above items (a) to (d). Moreover, it is apparent that the example of guidance by the display of an object following the orientation of the face on the display screen is not limited to the examples described in the above items (a) to (d).

In the guidance processing according to the second example, as described above, the user is guided by displaying an object that follows the orientation of the face on the display screen. In the case where the guidance processing according to the second example is performed, in one example, the user is able to move the face while obtaining feedback on how much to move it, and so it is advantageous that the guidance is easy to understand for the user.

(1-3) Third Example of Guidance Processing

The information processing device according to the present embodiment guides the user by controlling a device that changes the movement of the head. The information processing device according to the present embodiment controls the device that changes the movement of the head by transmitting a control signal including an instruction for controlling the operation of the device that changes the movement of the head to the device that changes the movement of the head.

Here, examples of the device that changes the movement of the head include a device that stimulates the head, a device that stimulates the muscles acting on the rotation of the head, a device that supports the head, such as a headrest, and the like.

Figure 23A:
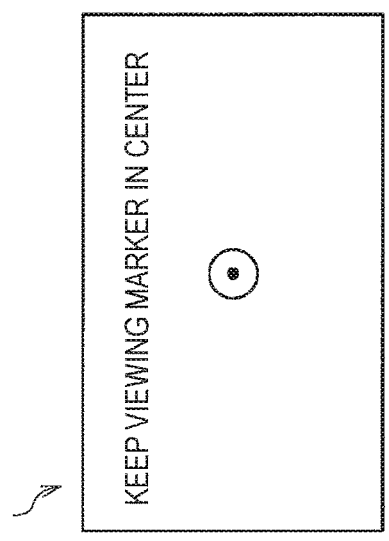
FIGS. 23A, 23B, and 23C are diagrams illustrated to describe guidance processing regarding the information processing method according to the present embodiment.
Figure 23B:
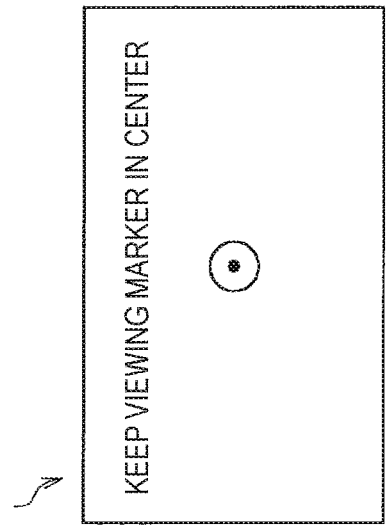
Figure 23C:
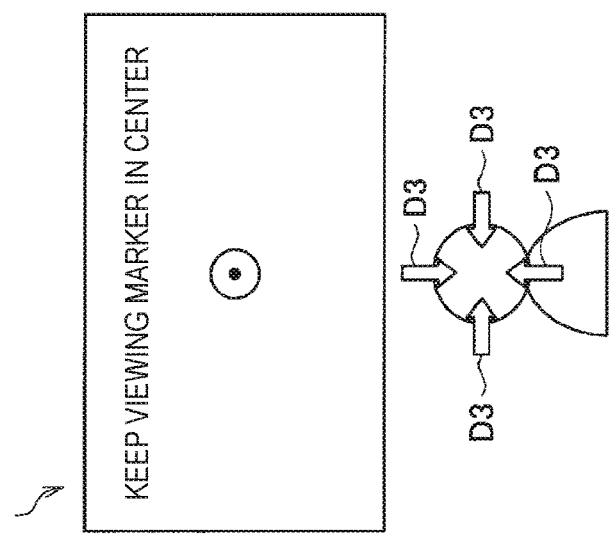

FIGS. 23A, 23B, and 23C are diagrams illustrated to describe the guidance processing regarding the information processing method according to the present embodiment, and shows an example of the guidance achieved by controlling the device that changes the movement of the head.

In FIGS. 23A, 23B, and 23C, FIG. 23A illustrates a case where the guidance is performed by a device D1 that stimulates the head. The device D1 that stimulates the head is attached to, in one example, the head of the user, and induces the rotation of the head by stimulating the head. Examples of the device D1 that stimulates the head include a device using the hanger reflex.

In FIGS. 23A, 23B, and 23C, FIG. 23B illustrates a case where the guidance is performed by a device D2 that stimulates the muscles acting on the rotation of the head. The device D2 that stimulates the muscles acting on the rotation of the head is attached to the site where the muscles acting on the rotation of the head exist, such as the neck portion, and induces the rotation of the head by stimulating the muscles using the electrical stimulation.

In FIGS. 23A, 23B, and 23C, FIG. 23C illustrates a case where the guidance is performed by a device D3 that supports the head, such as a headrest. The device D3 that supports the head rotates the head by applying an external force to the head while supporting the head.

Examples of the guidance processing according to the third example include controlling the device that changes the movement of the head as illustrated in FIGS. 23A, 23B, and 23C. Moreover, the example of the device that changes the movement of the head is not limited to the example illustrated in FIGS. 23A, 23B, and 23C, but it may be any device capable of changing the movement of the head.

In the guidance processing according to the third example, as described above, the user is guided by controlling the device that changes the movement of the head. In the case where the guidance processing according to the third example is performed, the user's head moves without limitation, in one example, by the device that changes the movement of the head, so there is an advantage that the user is able to concentrate consciousness on viewing.

(1-4) Other Examples of Guidance Processing

The information processing device according to the present embodiment may further guide the user in such a manner that the position (e.g., the standing position) of the user is changed. The position of the user is estimated on the basis of, in one example, a captured image captured by an image capturing device arranged in the surroundings as described above. The information processing device according to the present embodiment guides the user's position, in one example, using one or more of the visual method, the auditory method, and the tactile method.

In one example, it is possible to reduce the load on which the user moves the head and to improve the accuracy of the calibration using the sampled detection data for calibration calculation by further guiding the position of the user.

Further, as illustrated as feedback for the user in each of the guidance processing according to the first example described in the above item (1-1) to the guidance processing according to the third example described in the above item (1-3), the information processing device according to the present embodiment is capable of notifying the user of the guidance state of the user. The information processing device according to the present embodiment notifies the user of the user's guidance state, in one example, using one or more of the visual method, the auditory method, and the tactile method.

Further, the information processing device according to the present embodiment may perform the guidance processing corresponding to software that uses the gaze-related information.

In one example, the information processing device according to the present embodiment refers to a table (or database) in which information indicating software (e.g., software ID) and information indicating the guidance processing (e.g., guidance processing ID) are associated with each other, and so specifies the guidance processing corresponding to the software and performs the specified guidance processing.

The information processing device according to the present embodiment performs, in one example, the above-described processing as the guidance processing. The guidance of the user by performing the guidance processing by the information processing device according to the present embodiment can achieve, in one example, the following effects.

Reduce the load on the user during calibration.

No limitation to the size of the display area of the calibration point and allowing the user's eyes to be swung in a desired range.

(2) Software Control Processing

The information processing device according to the present embodiment performs processing for controlling the software using the gaze-related information. Here, examples of the software using the gaze-related information include an operating system (OS), system software, application software, and the like.

In one example, the information processing device according to the present embodiment causes the software to perform an operation corresponding to one or both of the gaze direction and position indicated by the gaze-related information. Here, the software controlled by the information processing device according to the present embodiment may be software executed in the information processing device according to the present embodiment or may be software executed in an external device of the information processing device according to the present embodiment. In a case where the software controlled by the information processing device according to the present embodiment is software executed in an external device, the information processing device according to the present embodiment controls the software by transmitting a control signal including a control instruction for controlling software to the external device.

Further, the information processing device according to the present embodiment is capable of controlling the UI as the control of software. The information processing device according to the present embodiment determines the size of the UI to be displayed on the display screen on the basis of the head detection result and the line-of-sight use range that is set when the calibration information is acquired. Then, the information processing device according to the present embodiment causes the UI having the determined size to be displayed on the display screen.

FIG. 24 is a diagram illustrated to describe an example of the software control processing regarding the information processing method according to the present embodiment, and illustrates an example of control of the UI.

Here, areas indicated by reference numerals SC1 and SC2 in the display screen D are relevant to an example of the UI corresponding to software. The following description is given as an example of a case where the areas indicated by reference numerals SC1 and SC2 are an operation screen for the user to perform an operation by the user's line of sight.

In one example, if a call operation including an operation of an operation device such as a button, an operation by voice, an operation such as gesture is performed on any operation screen, the operation screens SC1 and SC2 are displayed at the position where the user is facing (e.g., a position corresponding to the gaze direction indicated by the gaze-related information or the gaze position indicated by the gaze-related information).

Here, in one example, the information processing device according to the present embodiment determines the size of the UI to be displayed on the display screen, on the basis of the line-of-sight use range (the calibrated swing width of the eye) and the distance, based on the head detection result or the like, from the front of the face of the user to the display screen D. The information processing device according to the present embodiment determines the size of the UI to be displayed on the display screen by, in one example, referring to "a table (or database) in which settings indicating the line-of-sight use range, distance, and size of the UI are associated with each other".

The user selects an object regarding the UI such as a menu item included in the operation screens SC1 and SC2 with the user's line of sight. In addition, in a case where the user performs an optional decision operation including an operation of an operation device such as a button, an operation by voice, an operation such as gesture, processing corresponding to the object regarding the selected UI is performed.

The information processing device according to the present embodiment determines the size of the UI to be displayed on the display screen as described above, and so it is possible to secure the accuracy of detection of the line of sight and to further enhance the visibility of the UI.

Figure 25:
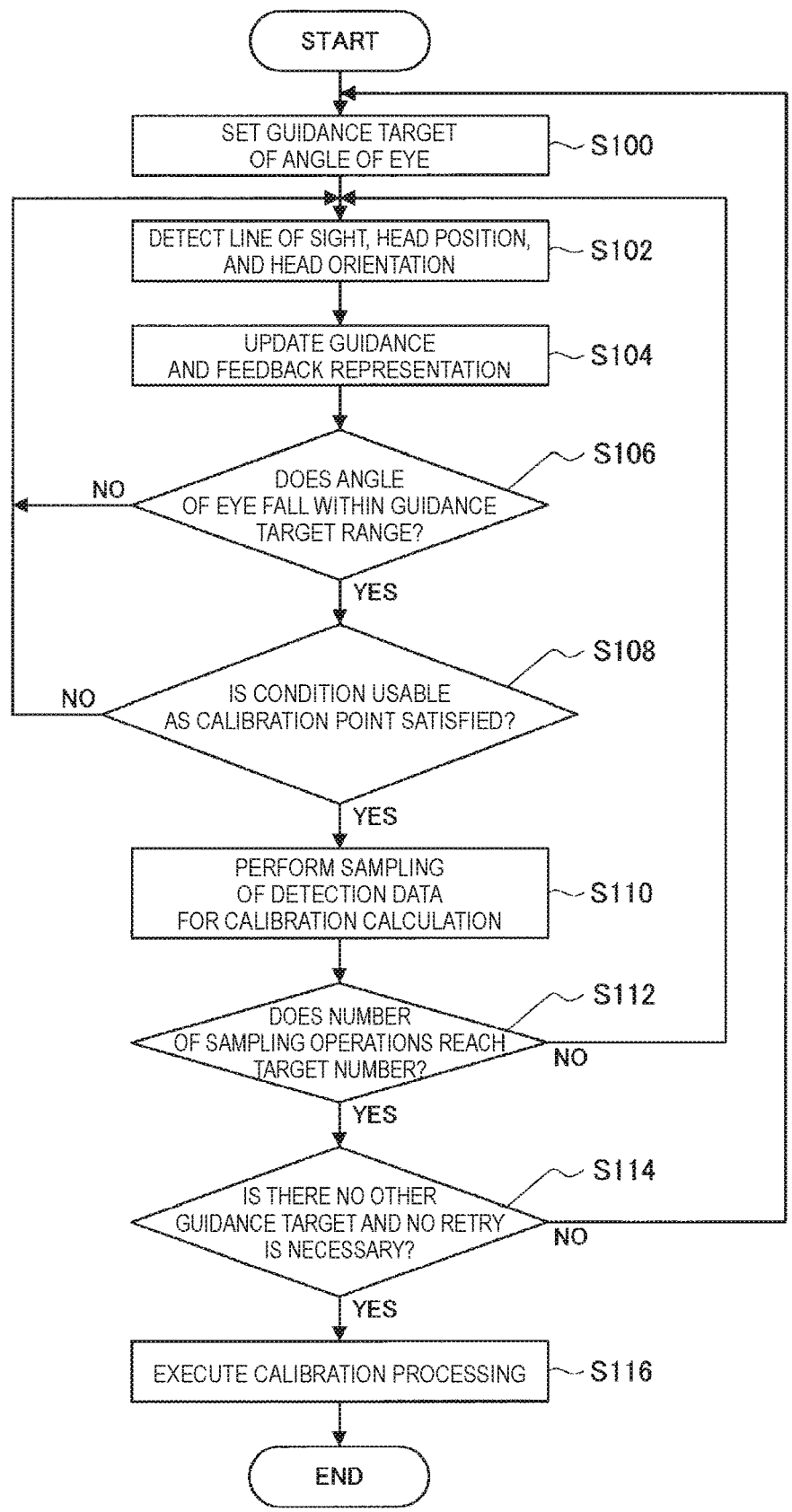
FIG. 25 is a flowchart illustrating an example of processing regarding the information processing method according to the present embodiment.

[3-3] Example of Processing Regarding Information Processing Method According to Present Embodiment Next, an example of processing regarding the information processing method according to the present embodiment is illustrated. FIG. 25 is a flowchart illustrating an example of processing regarding the information processing method according to the present embodiment.

The information processing device according to the present embodiment sets a guidance target of the angle of the eye (S100). The information processing device according to the present embodiment sets the guidance target of the angle of the eye, in one example, in the order of the guidance points P5, P1, P2, P3, and P4 of the angle of the eye illustrated in the portion FIG. 8B. Moreover, it is apparent that the example of setting the guidance target of the angle of the eye is not limited to the example illustrated above.

The information processing device according to the present embodiment detects the line of sight, head position, and orientation of the user on the basis of the detection result of the user's head and the detection result of the user's line of sight (S102).

The information processing device according to the present embodiment updates the guidance representation and the feedback representation of the user on the basis of the result of detection in step S102 (S104).

The information processing device according to the present embodiment determines whether the angle of the eye falls within the guidance target range (S106). In a case where the angle of the eye falls within the guidance area (the guidance point of the angle of the eye), the information processing device according to the present embodiment determines that the angle of the eye falls within the guidance target range.

In a case where it is not determined in step S106 that the angle of the eye falls within the guidance target range, the information processing device according to the present embodiment repeats the processing from step S102.

Further, in a case where it is determined in step S106 that the angle of the eye falls within the guidance target range, the information processing device according to the present embodiment determines whether the condition that can be used as a calibration point is satisfied (S108). An example of the condition usable as the calibration point includes a condition regarding the processing intended to secure the accuracy of calibration described above (e.g., the movement of the eye of the user is statically determined).

In a case where it is not determined in step S108 that the condition usable as a calibration point is satisfied, the information processing device according to the present embodiment repeats the processing from step S102.

Further, in a case where it is determined in step S108 that the condition usable as the calibration point is satisfied, the information processing device according to the present embodiment samples the detection data for calibration calculation (S110).

When the processing of step S110 is performed, the information processing device according to the present embodiment determines whether the number of sampling operations of the detection data for calibration calculation reaches a target number (S112). In one example, in a case where the number of sampling operations is equal to or larger than a threshold corresponding to the target number (when the number of sampling operations is larger than the threshold), the information processing device according to the present embodiment determines that the number of sampling operations reaches the target number. Here, the threshold corresponding to the target number may be a fixed value set in advance, or it may be a variable value that is changeable on the basis of a user operation or the like.

In a case where it is not determined in step S112 that the number of sampling operations reaches the target number, the information processing device according to the present embodiment repeats the processing from step S102.

Further, in a case where it is determined in step S112 that the number of sampling operations reaches the target number, the information processing device according to the present embodiment determines whether there is no other guidance target and no retry is necessary for the current guidance target (S114). In a case where the contribution rate of the correlation coefficient calculated on the basis of the sampled detection data for calibration calculation is equal to or smaller than the set threshold (or case where the contribution rate is smaller than the threshold), the information processing device according to the present embodiment determines that the retry is necessary.

In a case where it is not determined in step S114 that there is no other guidance target and no retry is necessary for the current guidance target, the information processing device according to the present embodiment repeats, in one example, the processing from step S100.

Further, in a case where it is determined in step S114 that there is no other guidance target and no retry is necessary for the current guidance target, the information processing device according to the present embodiment executes the calibration processing on the basis of the sampled detection data for calibration calculation (S116). The information processing device according to the present embodiment, in one example, generates calibration information on the basis of the sampled detection data for calibration calculation. In addition, the information processing device according to the present embodiment calibrates the line-of-sight detection result, in one example, on the basis of the calibration information.

The information processing device according to the present embodiment performs, in one example, the processing illustrated in FIG. 25 as the processing regarding the information processing method according to the present embodiment. Moreover, it is apparent that the example of the processing regarding the information processing method according to the present embodiment is not limited to the example illustrated in FIG. 25.

Information Processing Device According to Present Embodiment

An example of the configuration of the information processing device according to the present embodiment, capable of performing the processing regarding the information processing method according to the present embodiment described above is now described.

Figure 26:
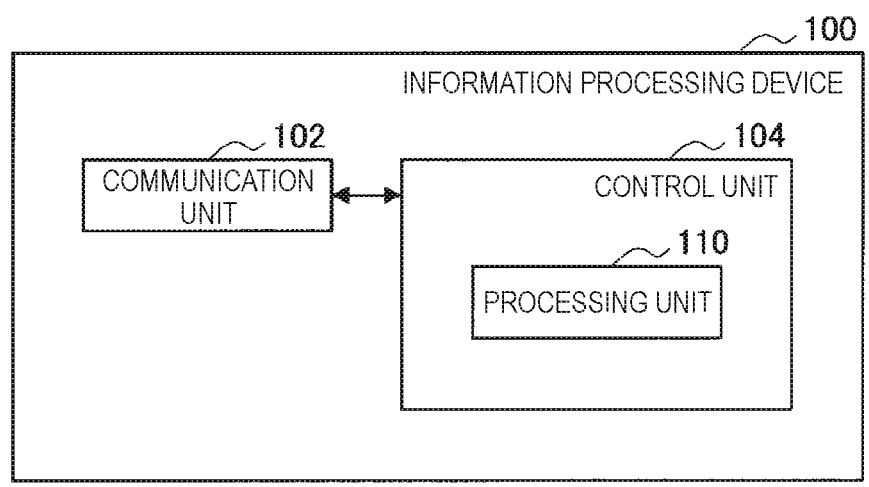
FIG. 26 is a block diagram illustrating an example of a configuration of an information processing device according to the present embodiment.

FIG. 26 is a block diagram illustrating an example of the configuration of an information processing device 100 according to the present embodiment. The information processing device 100 includes, in one example, a communication unit 102 and a control unit 104.

Further, the information processing device 100 may include read-only memory (ROM) (not shown), random-access memory (RAM) (not shown), a storage unit (not shown), an operation unit (not shown) operable by the user of the information processing device 100, a display unit (not shown) for displaying various screens on a display screen, or the like. In the information processing device 100, the components are connected with each other, in one example, through a bus serving as a data transmission channel.

The ROM (not shown) stores control data such as operation parameters and programs used by the control unit 104. The RAM (not shown) temporarily stores a program or the like to be executed by the control unit 104.

The storage unit (not shown) is a storage means included in the information processing device 100, and stores, in one example, the calibration information, data such as "the table in which the size of the line-of-sight use range, the distance, and the size of the line-of-sight use range R are associated with each other" regarding the information processing method according to the present embodiment, and various data such as various applications. Here, examples of the storage unit (not shown) include a magnetic recording medium such as a hard disk, a nonvolatile memory such as a flash memory, or the like. In addition, the storage unit (not shown) may be detachable from the information processing device 100.

An example of the operation unit (not shown) includes an operation input device to be described later. In addition, an example of the display unit (not shown) includes a display device to be described later.

Example of Hardware Configuration of Information Processing Device 100

Figure 27:
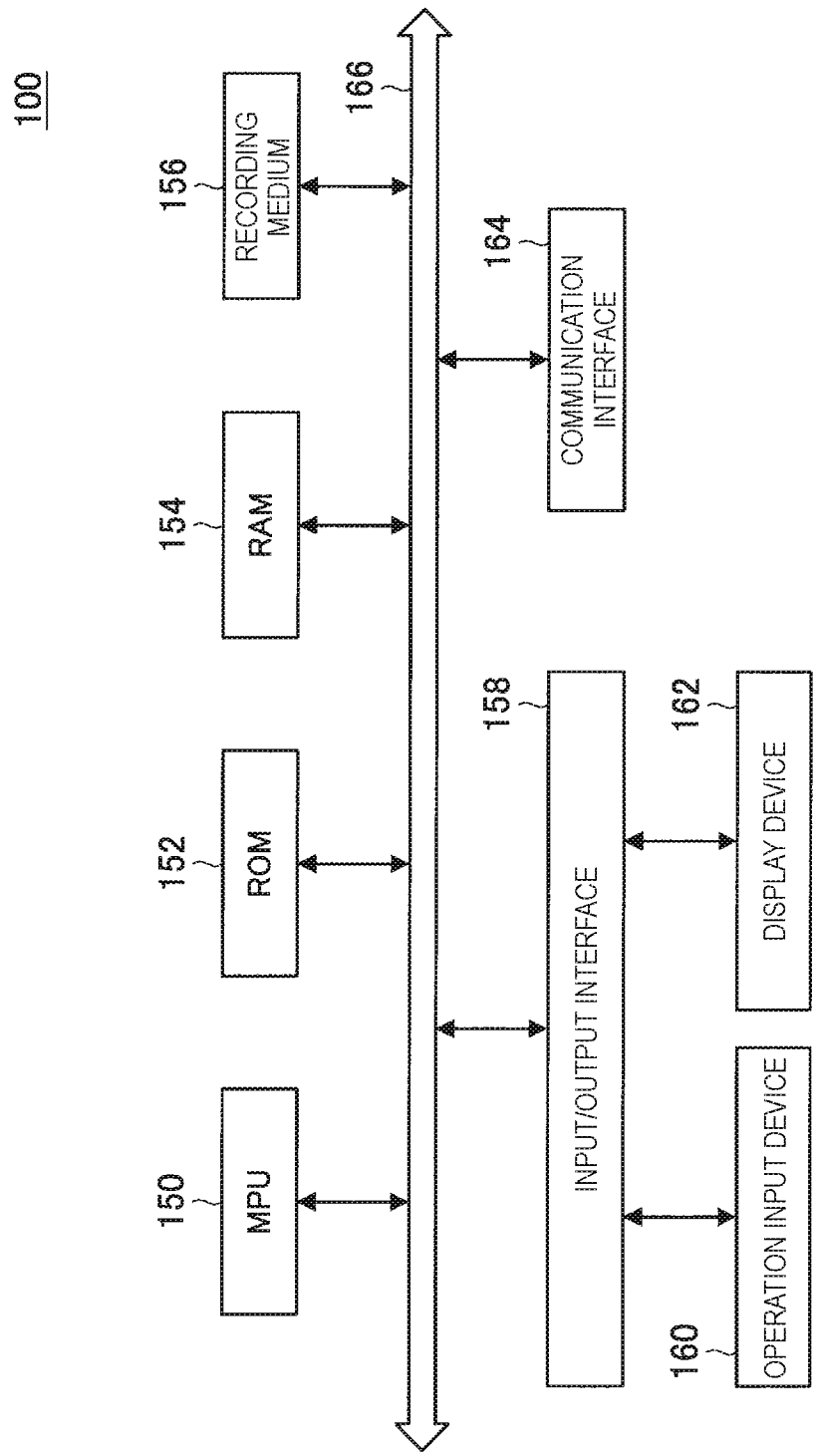
FIG. 27 is a diagram illustrated to describe an example of a hardware configuration of the information processing device according to the present embodiment.

FIG. 27 is a diagram illustrated to describe an example of a hardware configuration of the information processing device 100 according to the present embodiment. The information processing device 100 includes, in one example, an MPU 150, a ROM 152, a RAM 154, a recording medium 156, an input/output interface 158, an operation input device 160, a display device 162, and a communication interface 164. In addition, in the information processing device 100, the components are connected with each other, in one example, through a bus 166 serving as a data transmission channel. In addition, the information processing device 100 is driven by, in one example, power supplied from an internal power supply such as a battery included in the information processing device 100, power supplied from a connected external power supply, or the like.

The MPU 150 includes one or more processors constituted by arithmetic circuits such as micro processing unit (MPU), various processing circuits, and the like, and functions as the control unit 104 that controls the entire information processing device 100. In addition, the MPU 150 plays a role of, in one example, the processing unit 110 to be described later in the information processing device 100. Moreover, the processing unit 110 may be constituted by a dedicated (or general-purpose) circuit (e.g., a processor separate from the MPU 150, etc.) that can implement the processing of the processing unit 110.

The ROM 152 stores control data such as operation parameters and programs used by the MPU 150. The RAM 154 temporarily stores, in one example, a program to be executed by the MPU 150.

The recording medium 156 functions as the storage unit (not shown), and stores, in one example, data regarding the information processing method according to the present embodiment, such as calibration information and various data such as various applications. Here, examples of the recording medium 156 include a magnetic recording medium such as a hard disk and a nonvolatile memory such as a flash memory. In addition, the recording medium 156 may be detachable from the information processing device 100.

The input/output interface 158 is used for connection of, in one example, the operation input device 160 or the display device 162. The operation input device 160 functions as the operation unit (not shown), and the display device 162 functions as the display unit (not shown). Here, examples of the input/output interface 158 include a universal serial bus (USB) terminal, a digital visual interface (DVI) terminal, a high-definition multimedia interface (HDMI, registered trademark) terminal, various processing circuits, or the like.

Further, the operation input device 160 is provided on, in one example, the information processing device 100, and is connected with the input/output interface 158 inside the information processing device 100. Examples of the operation input device 160 include buttons, direction keys, rotary selectors such as a jog dial, or combinations thereof.

Further, the display device 162 is provided on, in one example, the information processing device 100, in one example, and is connected with the input/output interface 158 inside the information processing device 100. Examples of the display device 162 include a liquid crystal display (LCD), an organic electro-luminescence (EL) display (also referred to as an organic light emitting diode (OLED) display), or the like.

Moreover, it is apparent that the input/output interface 158 is capable of being connected to an external device, such as an operation input device (e.g., a keyboard, a mouse, etc.) installed outside of the information processing device 100 or an external display device. In addition, the display device 162 may be a device, such as a touch panel, capable of performing both display and user operation.

The communication interface 164 is a communication means included in the information processing device 100, and, in one example, functions as the communication unit 102 for performing wireless or wired communication with external apparatus, external device, or the like via a network (or directly). Here, examples of the communication interface 164 include the communication antenna and radio frequency (RF) circuit (wireless communication), the IEEE 802.15.1 port and transmission/reception circuit (wireless communication), the IEEE 802.11 port and transmission/reception circuit (wireless communication), the local area network (LAN) terminal and transmission/reception circuit (wired communication), and the like.

The information processing device 100 having, in one example, the configuration illustrated in FIG. 27 performs the processing regarding the information processing method according to the present embodiment. Moreover, the hardware configuration of the information processing device 100 according to the present embodiment is not limited to the configuration illustrated in FIG. 27.

In one example, in a case where the information processing device 100 communicates with an external device or the like via an external communication device being connected thereto, the information processing device 100 may not necessarily include the communication interface 164. In addition, the communication interface 164 may be configured to be capable of communicating with one or more external devices or the like by a plurality of communication schemes.

Further, in one example, the information processing device 100 can have a configuration that does not include the recording medium 156, the operation input device 160, or the display device 162.

Further, the information processing device 100 can have a configuration, in one example, corresponding to an application example of the information processing device 100 to be described later.

Further, in one example, some or all of the components (or the components according to the modification) illustrated in FIG. 27 may be implemented with one or more integrated circuits (ICs).

Referring again to FIG. 26, an example of the configuration of the information processing device 100 is described. The communication unit 102 is a communication means included in the information processing device 100, and communicates with an external device wirelessly or by wire via a network (or directly). In addition, the communication unit 102 is controlled by, in one example, the control unit 104.

Here, examples of the communication unit 102 include a communication antenna and RF circuit, a LAN terminal and transmission/reception circuit, or the like, but the configuration of the communication unit 102 is not limited to the above. In one example, the communication unit 102 can have a configuration that supports any standard capable of communicating with the USB terminal and transmission/reception circuit, or any configuration capable of communicating with an external device via a network. In addition, the communication unit 102 may be configured to be capable of communicating with one or more external devices or the like by a plurality of communication schemes.

The control unit 104 is constituted by, in one example, an MPU or the like and plays a role of controlling the entire information processing device 100. In addition, the control unit 104 includes the processing unit 110, in one example, and plays a leading role in performing the processing regarding the information processing method according to the present embodiment.

The processing unit 110 plays a leading role in performing the processing regarding the information processing method according to the present embodiment, and acquires the gaze-related information corresponding to the user on the basis of the detection result of the user's head and the detection result of the user's line of sight.

In one example, the processing unit 110 calibrates the line-of-sight detection result on the basis of the calibration information, and acquires the gaze-related information on the basis of the head detection result and the calibrated detection result of the line of sight.

In addition, the processing unit 110 may further perform, in one example, one or both of the processing (the guidance processing) described in the above item (1) and the processing (the software control processing) described in the above item (2).

Figure 28:
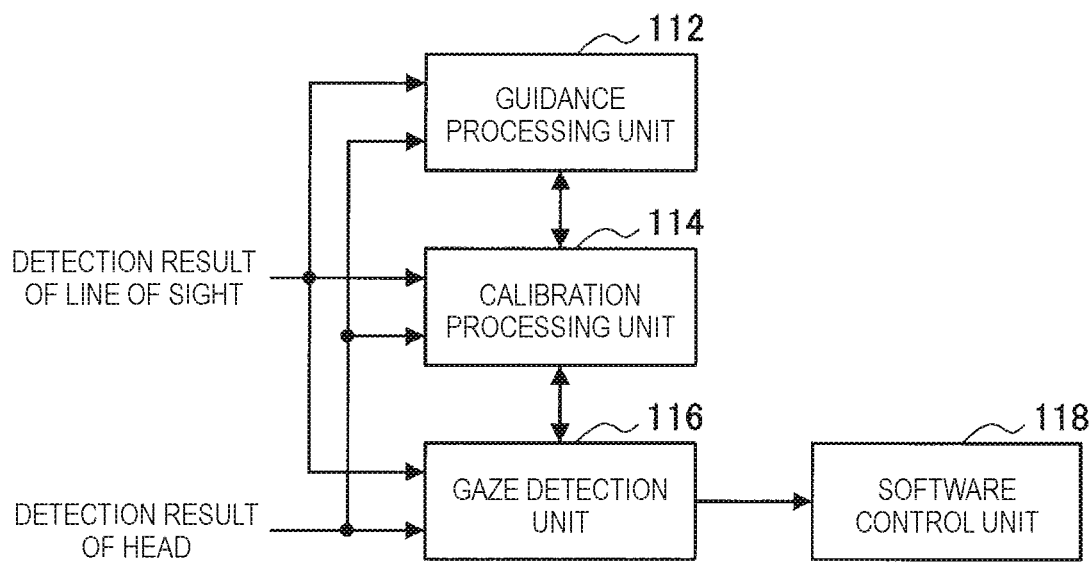
FIG. 28 is a block diagram illustrated to describe an example of functions of a processing unit included in the information processing device according to the embodiment.

FIG. 28 is a block diagram illustrated to describe an example of functions of the processing unit 110 included in the information processing device 100 according to the present embodiment. FIG. 28 illustrates an example of a configuration in the case where the processing unit 110 has a function of performing the processing (the guiding processing) described in the above item (1) and the processing (the software control processing) described in the above item (2).

The processing unit 110 includes, in one example, a guidance processing unit 112, a calibration processing unit 114, a gaze detection unit 116, and a software control unit 118.

The guidance processing unit 112 performs the processing (the guidance processing) described in the above item (1).

The calibration processing unit 114 generates calibration information, in one example, on the basis of the sampled detection data for calibration calculation. Then, the calibration processing unit 114 associates the generated calibration information with information indicating the user (e.g., one or more data or the like capable of specifying a user, such as a user ID, biological information of a user, etc.) and records it on a recording medium such as a storage unit (not shown) or an external recording medium.

Here, in one example, the processing of generating the calibration information is performed in a case where the calibration information is not stored in the recording medium (e.g., the initial state), a case where the set period is elapsed since the previous calibration information is generated, and a case where an operation to perform the calibration is detected.

Further, the calibration processing unit 114 calibrates the line-of-sight detection result, in one example, on the basis of the calibration information.

The gaze detection unit 116 acquires the gaze-related information corresponding to the user on the basis of the detection result of the user's head and the detection result of the user's line of sight. In a case where the line detection result is calibrated in the calibration processing unit 114, the gaze detection unit 116 acquires the gaze-related information on the basis of the head detection result and the calibrated line-of-sight detection result. The gaze detection unit 116 acquires the gaze-related information by estimating one or both of the gaze direction and the gaze position on the basis of the detection result of the user's head and the detection result of the user's line of sight (or the calibrated line-of-sight detection result).

The software control unit 118 performs the processing (the software control processing) described in the above item (2).

In one example, the processing unit 110 having, in one example, the configuration illustrated in FIG. 28 plays a leading role in performing processing regarding the information processing method according to the present embodiment. Moreover, it is apparent that the configuration of the processing unit 110 is not limited to the example illustrated in FIG. 28.

The information processing device 100 having, in one example, the configuration illustrated in FIG. 26 performs the processing regarding the information processing method according to the present embodiment. Thus, it is possible for the information processing device 100 having, in one example, the configuration illustrated in FIG. 26 to improve the accuracy in estimating the user's line of sight.

Further, the configuration illustrated in FIG. 26 makes it possible for the information processing device 100 to have the effect that is achieved by performing the processing regarding the information processing method according to the present embodiment as described above.

Moreover, the configuration of the information processing device according to the present embodiment is not limited to the configuration illustrated in FIG. 26.

In one example, the information processing device according to the present embodiment includes the processing unit 110 illustrated in FIG. 26 as a separate component from the control unit 104 (e.g., implemented as another processing circuit). In addition, the processing unit 110 may be implemented by a plurality of processing circuits, and each function may be distributed in a plurality of processing circuits.

Further, the configuration for implementing the processing regarding the information processing method according to the present embodiment is not limited to the configuration illustrated in FIG. 26, and it is possible to achieve a configuration corresponding to a method of dividing the processing regarding the information processing method according to the present embodiment.

Further, in one example, in a case where the information processing device according to the present embodiment communicates with an external device through an external communication device having similar function and configuration as those of the communication unit 102, the information processing device according to the present embodiment may not necessarily include the communication unit 102.

As described above, the information processing device is described as an example of the present embodiment, but the present embodiment is not limited to such an embodiment. The present embodiment is applicable to various devices, capable of performing the processing regarding the information processing method according to the embodiment, such as "any wearable device worn on the user's body such as glasses type eyewear device, smart watch devices, and smart wrist band devices", "communication devices such as smartphone", "image projection devices such as projector", "display devices", "tablet devices", "game consoles", "mobile objects such as automobile", or the like. In addition, the present embodiment is also applicable to a processing IC that can be incorporated, in one example, in the device described above, in one example.

Further, the information processing device according to the present embodiment may be applied to a processing system on the premise of connection to a network (or communication between devices) such as cloud computing. An example of the processing system in which the processing regarding the information processing method according to the present embodiment is performed include "a system in which some the processing regarding the information processing method according to the present embodiment is performed by one device that constitutes the processing system and in which processing other than some of the processing regarding the information processing method according to the present embodiment is performed by another device that constitutes the processing system", or the like.

Program According to Present Embodiment

A program for causing a computer to function as the information processing device according to the present embodiment (e.g., a program capable of executing the processing regarding the information processing method according to the present embodiment) is executed by a processor or the like in a computer. Thus, it is possible to improve the accuracy in estimating the user's line of sight.

Further, the execution of the program for causing the computer to function as the information processing device according to the present embodiment by the processor or the like in the computer makes it possible to obtain the effects achieved by the processing regarding the information processing method according to the present embodiment.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In one example, in the above, the description is given of the case of providing the program (computer program) for causing the computer to function as the information processing device according to the present embodiment, but in the present embodiment, a recording medium having the program stored thereon can also be provided.

The above-described configuration shows an example of the present embodiment, and it naturally belongs to the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

a processing unit configured to acquire gaze-related information corresponding to a user on a basis of a detection result of a head of the user and a detection result of a line of sight of the user.

(2)

The information processing device according to (1), in which the processing unit calibrates the line-of-sight detection result on a basis of calibration information corresponding to a predetermined angle of an eye, the calibration information being acquired on a basis of the head detection result and the line-of-sight detection result, and acquires the gaze-related information on a basis of the head detection result and the calibrated line-of-sight detection result.

(3)

The information processing device according to (2), in which the processing unit, in a case of acquiring the calibration information, performs guidance processing for guiding the user in such a manner that an angle of an eye of the user is the predetermined angle.

(4)

The information processing device according to (3), in which the processing unit performs first guidance processing for guiding the user in such a manner that the user changes an orientation of a face while viewing a predetermined object displayed on a display screen.

(5)
The information processing device according to (4),
in which the predetermined object is an indicator object that indicates the orientation of the face, and
the processing unit guides the user by causing the indicator object to be displayed on the display screen.

(6)
The information processing device according to (5),
in which the processing unit changes the orientation of the face indicated by the indicator object in a case where the orientation of the face is no longer detected when guidance is not completed.

(7)
The information processing device according to (6),
in which the processing unit reduces a guidance range for guiding the user in a case where the orientation of the face is detected again.

(8)
The information processing device according to any one of (4) to (7),
in which the processing unit guides the user by causing sound that indicates the orientation of the face to be output from a sound output device.

(9)
The information processing device according to any one of (4) to (8),
in which the processing unit changes a display position of the predetermined object in such a manner that a difference between the predetermined angle and the angle of the user's eye is reduced on a basis of a result obtained by comparing the predetermined angle and the angle of the user's eye.

(10)
The information processing device according to (3),
in which the processing unit performs second guidance processing for guiding the user by causing an object that follows an orientation of a face to be displayed on a display screen.

(11)
The information processing device according to (3),
in which the processing unit performs third guidance processing for guiding the user by controlling a device that changes movement of a head portion.

(12)
The information processing device according to any one of (3) to (11),
in which the processing unit causes the user to be notified of a state of guidance of the user.

(13)
The information processing device according to any one of (3) to (12),
in which the processing unit further guides the user in such a manner that a position of the user is changed.

(14)
The information processing device according to any one of (3) to (13),
in which the processing unit performs the guidance processing corresponding to software using the gaze-related information.

(15)
The information processing device according to any one of (1) to (14),
in which the gaze-related information indicates one or both of an estimated gaze direction and an estimated gaze position.

(16)
The information processing device according to any one of (2) to (14),
in which the processing unit further performs processing for controlling software using the gaze-related information.

(17)
The information processing device according to (16),
in which the processing unit determines a size of a user interface to be displayed on a display screen on a basis of the head detection result and a line-of-sight use range that is set when the calibration information is acquired.

(18)
An information processing method executed by an information processing device, the method including:
a step of acquiring gaze-related information corresponding to a user on a basis of a detection result of a head of the user and a detection result of a line of sight of the user.

(19)
A program causing a computer to implement:
a function of acquiring gaze-related information corresponding to a user on a basis of a detection result of a head of the user and a detection result of a line of sight of the user.

REFERENCE SIGNS LIST

100 information processing device
102 communication unit
104 control unit
110 processing unit
112 guidance processing unit
114 calibration processing unit
116 gaze detection unit
118 software control unit

The invention claimed is:

1. An information processing device, comprising:
circuitry configured to:
acquire first gaze-related information of a user based on a detection result of a head of the user and a detection result of a line-of-sight of the user;
execute a first guidance process to guide the user such that an angle of an eye of the user is a specific angle;
acquire calibration information based on the executed first guidance process, the detection result of the head of the user, and the detection result of the line-of-sight of the user;
control a display screen to display a first specific object;
control the display screen to display a model of a face of the user; and
change an orientation of the displayed model of the face based on a failure of detection of an orientation of the face and incompletion of the first guidance process, wherein the first specific object is a first indicator object that indicates the orientation of the displayed model of the face.

2. The information processing device according to claim 1, wherein the circuitry is further configured to:
calibrate the detection result of the line-of-sight based on the acquired calibration information; and
acquire second gaze-related information based on the detection result of the head and the calibrated detection result of the line-of-sight.

3. The information processing device according to claim 2, wherein the circuitry is further configured to:
control the display screen to display a second specific object; and
execute the first guidance process to guide the user such that the orientation of the face of the user is changed while the user views the displayed second specific object.

4. The information processing device according to claim 3, wherein the second specific object is a second indicator object that indicates the orientation of the face.

5. The information processing device according to claim 4, wherein the circuitry is further configured to reduce a guidance range associated with the first guidance process, based on the detection of the orientation of the face.

6. The information processing device according to claim 3, wherein the circuitry is further configured to control a sound output device to output sound that indicates the orientation of the face.

7. The information processing device according to claim 3, wherein the circuitry is further configured to:
compare the specific angle with the angle of the eye of the user; and
change, based on a result of the comparison, a display position of the second specific object such that a difference between the specific angle and the angle of the eye of the user is reduced.

8. The information processing device according to claim 2, wherein
the circuitry is further configured to:
execute a second guidance process for the user; and
control the display screen to display an object, wherein
the control of the display screen is based on the executed second guidance process, and
the displayed object follows the orientation of the face of the user.

9. The information processing device according to claim 2, wherein
the circuitry is further configured to:
execute a third guidance process for the user; and
control a device to change movement of a head portion of the user, and the control of the device is based on the executed third guidance process.

10. The information processing device according to claim 2, wherein the circuitry is further configured to notify a state of guidance of the user.

11. The information processing device according to claim 2, wherein the circuitry is further configured to execute the first guidance process to guide the user to change a position of the user.

12. The information processing device according to claim 2, wherein the first guidance process corresponds to an operating system that uses the first gaze-related information.

13. The information processing device according to claim 2, wherein the circuitry is further configured to control an operating system that uses the second gaze-related information.

14. The information processing device according to claim 13, wherein
the circuitry is further configured to determine a size of a user interface,
the user interface is displayed on the display screen,
the determination is based on the detection result of the head and a line-of-sight use range, and
the line-of-sight use range is based on the calibration information.

15. The information processing device according to claim 1, wherein the first gaze-related information indicates at least one of an estimated gaze direction or an estimated gaze position.

16. An information processing method executed by circuitry of an information processing device, the method comprising:
acquiring gaze-related information of a user based on a detection result of a head of the user and a detection result of a line-of-sight of the user;
executing a guidance process to guide the user such that an angle of an eye of the user is a specific angle;
acquiring calibration information based on the executed guidance process, the detection result of the head of the user, and the detection result of the line-of-sight of the user;
controlling a display screen to display a specific object;
controlling the display screen to display a model of a face of the user; and
changing an orientation of the displayed model of the face based on a failure of detection of an orientation of the face and incompletion of the guidance process, wherein the specific object is an indicator object that indicates the orientation of the displayed model of the face.

17. A non-transitory computer-readable medium having stored thereon computer-executable instructions that, when executed by a processor, cause the processor to execute operations, the operations comprising:
acquiring gaze-related information of a user based on a detection result of a head of the user and a detection result of a line-of-sight of the user;
executing a guidance process to guide the user such that an angle of an eye of the user is a specific angle;
acquiring calibration information based on the executed guidance process, the detection result of the head of the user, and the detection result of the line-of-sight of the user;
controlling a display screen to display a specific object;
controlling the display screen to display a model of a face of the user; and
changing an orientation of the displayed model of the face based on a failure of detection of an orientation of the face and incompletion of the guidance process, wherein the specific object is an indicator object that indicates the orientation of the displayed model of the face.

18. An information processing device, comprising:
circuitry configured to:
acquire first gaze related information of a user based on a detection result of a head of the user and a detection result of a line-of-sight of the user;
execute a guidance process to guide the user such that an angle of an eye of the user is a specific angle;
acquire calibration information based on the executed guidance process, the detection result of the head of the user, and the detection result of the line-of-sight of the user;
calibrate the detection result of the line-of-sight based on the acquired calibration information;
acquire second gaze-related information based on the detection result of the head and the calibrated detection result of the line-of-sight;
control a display screen to display a specific object;
execute the guidance process to guide the user such that an orientation of a face of the user is changed while the user views the displayed specific object;
control the display screen to display a model of the face of the user; and
change an orientation of the displayed model of the face based on a failure of detection of the orientation of the face and incompletion of the guidance process, wherein the specific object is an indicator object that indicates the orientation of the displayed model of the face.

* * * * *